(12) United States Patent
Kim

(10) Patent No.: US 10,011,252 B2
(45) Date of Patent: Jul. 3, 2018

(54) VEHICLE CONTROL APPARATUS AND CONTROL METHOD THEREOF

(71) Applicant: MANDO CORPORATION, Gyeonggi-do (KR)

(72) Inventor: Wook-Hyeon Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 45 days.

(21) Appl. No.: 15/272,377

(22) Filed: Sep. 21, 2016

(65) Prior Publication Data

US 2017/0080909 A1 Mar. 23, 2017

(30) Foreign Application Priority Data

Sep. 22, 2015 (KR) .......................... 10-2015-0133447

(51) Int. Cl.
| | | |
|---|---|---|
| *B60T 8/24* | (2006.01) | |
| *B60T 8/172* | (2006.01) | |
| *B60T 7/12* | (2006.01) | |
| *B60T 13/66* | (2006.01) | |
| *B60T 17/22* | (2006.01) | |
| *F16D 66/00* | (2006.01) | |

(52) U.S. Cl.
CPC .............. *B60T 8/245* (2013.01); *B60T 7/122* (2013.01); *B60T 8/172* (2013.01); *B60T 13/662* (2013.01); *B60T 17/221* (2013.01); *B60T 2201/06* (2013.01); *F16D 2066/001* (2013.01)

(58) Field of Classification Search
CPC .......... B60T 8/245; B60T 7/122; B60T 8/172; B60T 13/662; B60T 17/221
See application file for complete search history.

(56) References Cited

U.S. PATENT DOCUMENTS

2015/0027823 A1* 1/2015 Murata .................. F16D 65/14
188/162

* cited by examiner

*Primary Examiner* — Michael Dean Lang
(74) *Attorney, Agent, or Firm* — Ladas & Parry, LLP

(57) ABSTRACT

Disclosed herein are a vehicle control apparatus and a vehicle control method thereof. The vehicle control apparatus includes an input unit to receive first current heat energy calculation information, receive second current heat energy calculation information, and receive a current degree of slope; an estimator to estimate a current temperature of the brake apparatus on the basis of information regarding the difference between the first current heat energy calculation information and the second current heat energy calculation information; a compensator to compensate for braking power between the brake apparatus and the brake friction material; and a controller to receive the first current heat energy calculation information, the second current heat energy calculation information, and the current degree of slope, transmit an estimation command to the estimator, and transmit a compensation command to the compensator.

20 Claims, 23 Drawing Sheets

VEHICLE CONTROL APPARATUS AND CONTROL METHOD THEREOF

CROSS-REFERENCE TO RELATED APPLICATION

This application claims the benefit of Korean Patent Application No. 2015-0133447, filed on Sep. 22, 2015 in the Korean Intellectual Property Office, the disclosure of which is incorporated herein by reference.

BACKGROUND

1. Field

Embodiments of the present disclosure relate to a vehicle control apparatus and a control method thereof.

2. Description of the Related Art

In general, a brake apparatus according to the related art is provided to brake a vehicle so as to park or stop the vehicle.

However, when a vehicle is parked or stopped on a hill, a parking force or a stopping force of the brake apparatus according to the related art decreases as time goes by and thus efficiently maintaining of a parking function or a stopping function is limited.

When the brake apparatus according to the related art is used, a parked state or a stopped state is not smoothly maintained after a vehicle is parked or stopped. Thus, improving the convenience of parking or stopping a vehicle is limited.

Thus, recently, research has been continuously conducted on an improved vehicle control apparatus capable of improving the efficiency of braking by compensating for braking power after a vehicle is parked or stopped, and a control method thereof.

In addition, recently, research has been continuously conducted on an improved vehicle control apparatus capable of improving the convenience of parking or stopping a vehicle while relieving the anxiety about a current braked state when the vehicle is parked or stopped, and a control method thereof.

Moreover, recently, research has been continuously conducted on an improved vehicle control apparatus capable of enabling a driver to identify a current unstable parked or stopped state so that the driver may provide a rapid initial response and to identify a current stable parked or stopped state to further improve the reliability of parking or stopping a vehicle, and a control method thereof.

Furthermore, recently, research has been continuously conducted on an improved vehicle control apparatus capable of preventing a traffic accident from occurring while suppressing an increase in maintenance costs for maintaining and repairing a vehicle, and a control method thereof.

SUMMARY

Therefore, it is an aspect of the present disclosure to provide a vehicle control apparatus capable of improving the efficiency of braking, and a control method thereof.

It is another aspect of the present disclosure to provide a vehicle control apparatus capable of relieving the anxiety about a current braked state when a vehicle is parked or stopped, and a control method thereof.

It is another aspect of the present disclosure to provide a vehicle control apparatus capable of improving the convenience of parking or stopping a vehicle, and a control method thereof.

It is another aspect of the present disclosure to provide a vehicle control apparatus capable of providing a rapid initial response, and a control method thereof.

It is another aspect of the present disclosure to provide a vehicle control apparatus capable of improving the reliability of parking or stopping a vehicle, and a control method thereof.

It is another aspect of the present disclosure to provide a vehicle control apparatus capable of suppressing an increase in maintenance costs, and a control method thereof.

It is another aspect of the present disclosure to provide a vehicle control apparatus capable of preventing a traffic accident from occurring while suppressing an increase in maintenance costs, and a control method thereof.

Additional aspects of the disclosure will be set forth in part in the description which follows and, in part, will be obvious from the description, or may be learned by practice of the disclosure.

According to an aspect of the present invention, there is provided a vehicle control apparatus comprising: an input unit to receive first current heat energy calculation information between a brake apparatus and a brake friction material when braking is applied, receive second current heat energy calculation information between the brake apparatus and the brake friction material when the braking is released, and receive a current degree of slope, wherein the first current heat energy calculation information, the second current heat energy calculation information, and the current degree of slope are sensed by a sensing device; an estimator to estimate a current temperature of the brake apparatus on the basis of information regarding the difference between the first current heat energy calculation information and the second current heat energy calculation information, wherein the first current heat energy calculation information comprises a brake pressure value, a friction coefficient of the brake friction material, and a rate of speed of each wheel, and the second current heat energy calculation information comprises an atmospheric temperature, a temperature of the brake apparatus, and the rate of speed of each wheel; a compensator to compensate for braking power between the brake apparatus and the brake friction material so as to reclamp the brake apparatus and the brake friction material to each other on the basis of a target braking power value which is set according to the estimated current temperature of the brake apparatus and the current degree of slope; and a controller to receive the first current heat energy calculation information, the second current heat energy calculation information, and the current degree of slope, transmit an estimation command to the estimator, and transmit a compensation command to the compensator.

At this time, the first current heat energy calculation information may further include at least one of a radius of each wheel, a radius of a disc, an area of the brake friction material, a weight of the brake apparatus, and a thermal property coefficient of a material of the brake apparatus.

Also, the second current heat energy calculation information may further include at least one of an area of the brake apparatus, the weight of the brake apparatus, and the thermal property coefficient of a material of the brake apparatus.

Also, the brake apparatus may comprise at least one of a disc brake and a drum brake.

Also, the brake friction material may comprise at least one of a brake pad and a brake lining.

Also, the vehicle control apparatus may further comprise: an identifier to identify that a current brake state is to be unstable unless a current brake state is maintained at a stopped state or a parked state of a vehicle during the application of the braking.

Also, the vehicle control apparatus may further comprise: an identifier to identify that a current brake state is stable when the brake apparatus and the brake friction material are reclamped to each other according to the target braking power value.

Also, the vehicle control apparatus may further comprise: a communication unit to communicate with a driver's portable mobile communication terminal and transmit a communication signal to the driver's portable mobile communication terminal to identify that a current brake state is to be unstable unless a current brake state is maintained at a stopped state or a parked state of a vehicle during the application of the braking, under control of the controller.

Also, the vehicle control apparatus may further comprise: a communication unit to communicate with a driver's portable mobile communication terminal and transmit a communication signal to the driver's portable mobile communication terminal to identify that a current brake state is stable when the brake apparatus and the brake friction material are reclamped to each other according to the target braking power value, under control of the controller.

Also, the brake apparatus may comprise a predetermined unique number, and the vehicle control apparatus may further comprise a communication unit to communicate with a terminal of a vehicle maintenance center and transmit a communication signal to the terminal to dispatch a manager who owns the terminal to the brake apparatus having the predetermined unique number when the reclamping of the brake apparatus according to the target braking power value is performed more than a predetermined number of times for a predetermined time, under control of the controller.

Also, the vehicle control apparatus may further comprise: a communication unit to communicate with a global positioning system (GPS) and transmit a communication signal to the GPS to detect location information of nearby vehicle maintenance centers when the reclamping of the brake apparatus according to the target braking power value is performed more than a predetermined number of times for a predetermined time, under control of the controller; and an identifier to identify the location information of the detected nearby vehicle maintenance centers.

Also, the vehicle control apparatus may further comprise: a selector to select the location information of a desired vehicle maintenance center among the location information of the detected nearby vehicle maintenance centers; and a driver to transmit a navigation driving signal to a navigation device to arrive at the vehicle maintenance center corresponding to the selected location information of the vehicle maintenance center.

Also, the vehicle control apparatus may further comprise: a communication unit to communicate with a global positioning system (GPS) and communicate with a terminal of a nearby vehicle maintenance center detected by the GPS when the reclamping of the brake apparatus according to the target braking power value is performed more than a predetermined number of times for a predetermined time, under control of the controller; an identifier to identify information inquiring whether a dispatch command is to be accepted or not, the information being received from the terminal of the detected nearby vehicle maintenance center; and a selector to select the dispatch command, which is included in the identified information inquiring whether the dispatch command is to be accepted or not, to be requested or not to be requested.

According to another aspect of the present invention, there is provided a vehicle control method comprising; a first input operation of receiving first current heat energy calculation information between a brake apparatus and a brake friction material when braking is applied, and receiving second current heat energy calculation information between the brake apparatus and the brake friction material when the braking is released, wherein the first current heat energy calculation information and the second current heat energy calculation information are sensed by a sensing device; an estimation operation of estimating a current temperature of the brake apparatus on the basis of information regarding the difference between the first current heat energy calculation information and the second current heat energy calculation information, wherein the first current heat energy calculation information comprises a brake pressure value, a friction coefficient of the brake friction material, and a rate of speed of each wheel, and the second current heat energy calculation information comprises an atmospheric temperature, a temperature of the brake apparatus, and the rate of speed of each wheel; a second input operation of receiving a current degree of slope sensed by the sensing device; and a compensation operation of compensating for braking power between the brake apparatus and the brake friction material so as to reclamp the brake apparatus and the brake friction material to each other on the basis of a target braking power value which is set according to the estimated current temperature of the brake apparatus and the current degree of slope.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
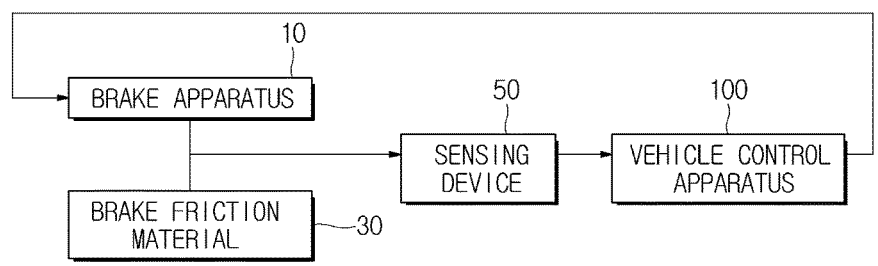
FIG. 1 is a block diagram illustrating a state in which a vehicle control apparatus in accordance with a first embodiment of the present disclosure is connected to a brake apparatus, a brake friction material, and a sensing device.

Hereinafter, embodiments of the present disclosure will be described in detail with reference to the accompanying drawings. These embodiments are provided to fully convey the idea of present disclosure to those of ordinary skill in the art. The present disclosure is, however, not limited to the embodiments set forth herein and may be embodied in other forms. For clarity, in the drawings, elements that are not related to describing the present disclosure are not illustrated, and the sizes of elements may be exaggerated to assist understanding of the present disclosure.

FIG. 1 is a block diagram illustrating a state in which a vehicle control apparatus in accordance with a first embodiment of the present disclosure is connected to a brake apparatus, a brake friction material, and a sensing device.

Figure 2:
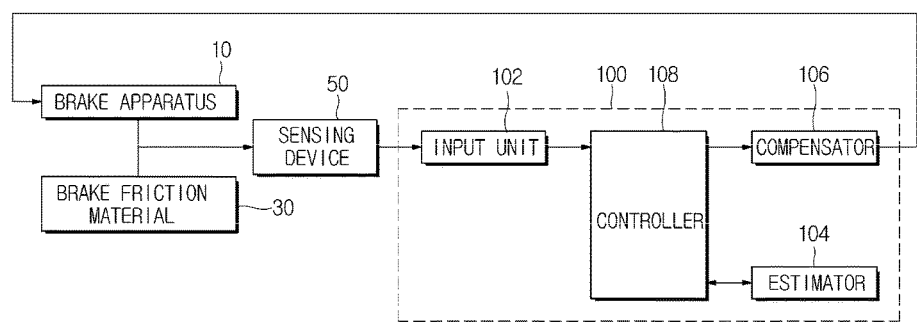
FIG. 2 is a block diagram of an example of the vehicle control apparatus of FIG. 1.

FIG. 2 is a block diagram of an example of the vehicle control apparatus of FIG. 1.

Figure 3:
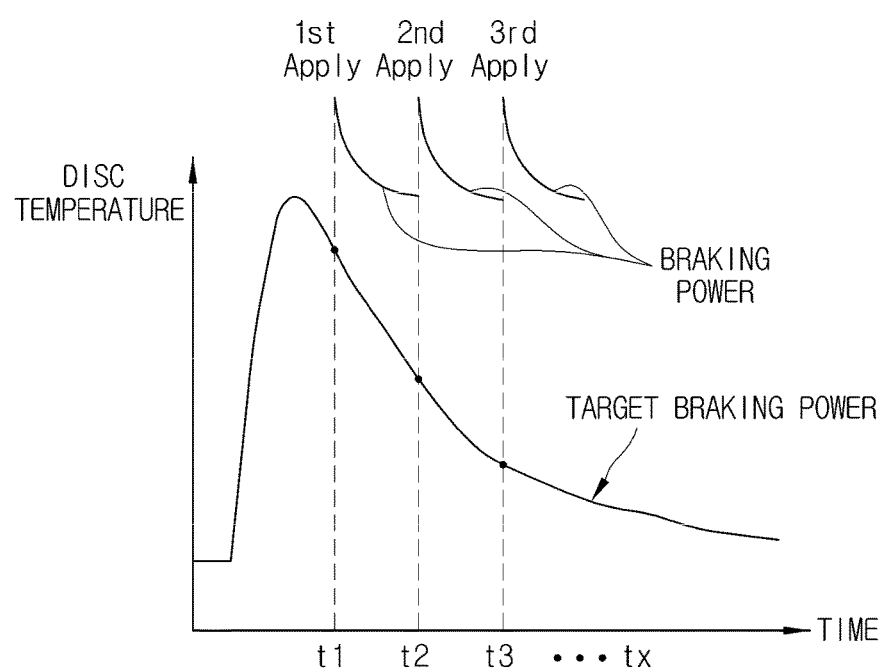
FIG. 3 is a graph showing a variation in a target braking power value according to temperature and a current degree of slope from a point of time t1 to a point of time tx, which is set by a compensator of FIG. 2.

FIG. 3 is a graph showing a variation in a target braking power value according to temperature and a current degree of slope from a point of time t1 to a point of time tx, which is set by a compensator of FIG. 2.

Referring to FIGS. 1 to 3, a vehicle control apparatus 100 in accordance with the first embodiment of the present disclosure includes an input unit 102, an estimator 104, a compensator 106, and a controller 108.

The input unit 102 receives first current heat energy calculation information between a brake apparatus 10 and a brake friction material 30, sensed by a sensing device 50 when a braking operation is applied.

The input unit 102 also receives second current heat energy calculation information between the brake apparatus 10 and the brake friction material 30, sensed by the sensing device 50 when the braking operation is released.

The input unit 102 also receives a current degree of slope sensed by the sensing device 50.

In this case, the input unit 102 may receive a current degree of slope in a parked state or a stopped state, sensed by the sensing device 50.

Here, the first current heat energy calculation information may include a brake pressure value, a friction coefficient of the brake friction material 30, and may further include at least one of a rate of speed of each wheel, and may further include a radius of each wheel, a radius of a disc, an area of the brake friction material 30, a weight of the brake apparatus 10, and a thermal property coefficient of a material of the brake apparatus 10.

The second current heat energy calculation information may include an atmospheric temperature, a temperature of the brake apparatus 10, and the rate of speed of each wheel, and may further include at least one of an area of the brake apparatus 10, the weight of the brake apparatus 10, and the thermal property coefficient of a material of the brake apparatus 10.

In this case, although not shown, the brake apparatus 10 may include at least one of a disc brake and a drum brake, and the brake friction material 30 may include at least one of a brake pad and a brake lining.

The estimator 104 estimates a current temperature of the brake apparatus 10 on the basis of information regarding the difference between the first current heat energy calculation information and the second current heat energy calculation information which are input to the input unit 102, under control of the controller 108.

The compensator 106 compensates for braking power between the brake apparatus 10 and the brake friction material 30 under control of the controller 108, so that the brake apparatus 10 and the brake friction material 30 may be reclamped to each other on the basis of a target braking power value TB set according to the current temperature of the brake apparatus 10 estimated by the estimator 104 and a current degree of slope.

For example, as illustrated in FIG. 3, the target braking power value TB may represent a state in which the brake apparatus 10 and the brake friction material 30 need be reclamped to each other for the first time according to a temperature of the brake apparatus 10 and a current degree of slope from the point of time t1 to the point of time t2 (1st Apply), a state in which the brake apparatus 10 and the brake friction material 30 need be reclamped to each other for the second time according to a temperature of the brake apparatus 10 and a current degree of slope from the point of time t2 to the point of time t3 (2nd Apply), or a state in which the brake apparatus 10 and the brake friction material 30 need be reclamped to each other for the third time according to a temperature of the brake apparatus 10 and a current degree of slope from the point of time t3 to the point of time tx (3rd Apply).

The controller 108 receives the first current heat energy calculation information, the second current heat energy calculation information, and the current degree of slope which are output from the input unit 102, transmits an estimation command to the estimator 104, and transmits a compensation command to the compensator 106.

In this case, although not shown, the input unit 102, the estimator 104, the compensator 106, and the controller 108 may be provided to a general electric control unit (ECU) which is a main computer applied to a vehicle and configured to control overall operations of the vehicle, receive data, estimate a current temperature of the brake apparatus 10, and compensate for the braking power between the brake apparatus 10 and the brake friction material 30.

Alternatively, although not shown, the input unit 102, the estimator 104, the compensator 106, and the controller 108 may be provided to a general micro-control unit (MCU) which includes a processor, a memory, and an input/output (I/O) device within a single chip and is configured to control overall operations of the vehicle, receive data, estimate a current temperature of the brake apparatus 10, and compensate for the braking power between the brake apparatus 10 and the brake friction material 30.

However, the input unit 102, the estimator 104, the compensator 106, and the controller 108 are not limited thereto, and may be any control means, any input means, any estimation means, and any compensation means capable of controlling overall operations of the vehicle, inputting data, estimating a current temperature of the brake apparatus 10, and compensating for the braking power between the brake apparatus 10 and the brake friction material 30.

Here, the input unit 102, the estimator 104, the compensator 106, and the controller 108 may be provided to the ECU or the MCU in an integrated form or separately.

A vehicle control method of controlling a vehicle using the vehicle control apparatus 100 in accordance with the first embodiment of the present disclosure will be described with reference to FIG. 4 below.

Figure 4:
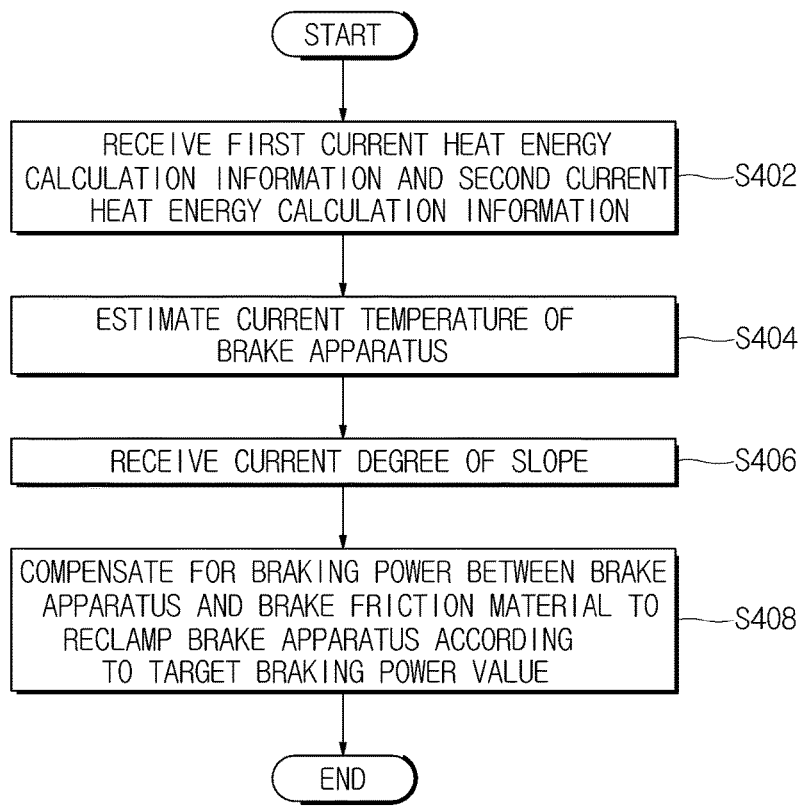
FIG. 4 is a flowchart of an example of a vehicle control method performed by the vehicle control apparatus in accordance with the first embodiment of the present disclosure.

FIG. 4 is a flowchart of an example of a vehicle control method performed by the vehicle control apparatus in accordance with the first embodiment of the present disclosure.

Referring to FIG. 4, a vehicle control method 400 performed by the vehicle control apparatus 100 of FIG. 2 in accordance with the first embodiment of the present disclosure includes a first input operation (S402), an estimation operation (S404), a second input operation (S406), and a compensation operation (S408).

First, in the first input operation (S402), when braking is applied, first current heat energy calculation information between the brake apparatus 10 of FIG. 2 and the brake friction material 30 of FIG. 2, sensed by the sensing device 50 of FIG. 2, is received from the input unit 102 of FIG. 2.

Furthermore, in the first input operation (S402), when the braking is released, second current heat energy calculation information between the brake apparatus 10 and the brake friction material 30, sensed by the sensing device 50, is received from the input unit 102.

Here, the first current heat energy calculation information may include a brake pressure value, a friction coefficient of the brake friction material 30, a rate of speed of each wheel, and may further include at least one of a radius of each wheel, a radius of a disc, an area of the brake friction material 30, a weight of the brake apparatus 10, and a thermal property coefficient of a material of the brake apparatus 10.

The second current heat energy calculation information may include an atmospheric temperature, a temperature of the brake apparatus 10, and the rate of speed of each wheel, and may further include at least one of an area of the brake apparatus 10, the weight of the brake apparatus 10, and the thermal property coefficient of a material of the brake apparatus 10.

Then, in the estimation operation (S404), a current temperature of the brake apparatus 10 is estimated by the estimator 104 of FIG. 2 on the basis of information regarding the difference between the first current heat energy calculation information and the second current heat energy calculation information which are input to the input unit 102, under control of the controller 108 of FIG. 2.

In the second input operation (S406), a current degree of slope sensed by the sensing device 50 is received from the input unit 102.

Thereafter, in the compensation operation (S408), braking power between the brake apparatus 10 and the brake friction material 30 is compensated for by the compensator 106 of FIG. 2 under control of the controller 108, so that the brake apparatus 10 and the brake friction material 30 may be reclamped to each other on the basis of the target braking power value TB of FIG. 3 set according to the current temperature of the brake apparatus 10 estimated by the estimator 104 and the current degree of slope.

For example, the target braking power value TB may represent a state in which the brake apparatus 10 and the brake friction material 30 need be reclamped to each other for the first time according to a temperature of the brake apparatus 10 and a current degree of slope from the point of time t1 to the point of time t2 (1st Apply), a state in which the brake apparatus 10 and the brake friction material 30 need be reclamped to each other for the second time according to a temperature of the brake apparatus 10 and a current degree of slope from the point of time t2 to the point of time t3 (2nd Apply), or a state in which the brake apparatus 10 and the brake friction material 30 need be reclamped to each other for the third time according to a temperature of the brake apparatus 10 and a current degree of slope from the point of time t3 to the point of time tx (3rd Apply).

In the vehicle control apparatus 100 and the vehicle control method 400 thereof in accordance with the first embodiment of the present disclosure described above, the input unit 102, the estimator 104, the compensator 106, and the controller 108 are provided to perform the first input operation (S402), the estimation operation (S404), the second input operation (S406), and the compensation operation (S408).

Accordingly, the vehicle control apparatus 100 and the vehicle control method 400 thereof in accordance with the first embodiment of the present disclosure are capable of compensating for the braking power between the brake apparatus 10 and the brake friction material 30 on the basis of the target braking power value TB according to the current temperature of the brake apparatus 10 and the current degree of slope, so that the brake apparatus 10 and the brake friction material 30 may be reclamped to each other, thereby improving the efficiency of braking.

Figure 5:
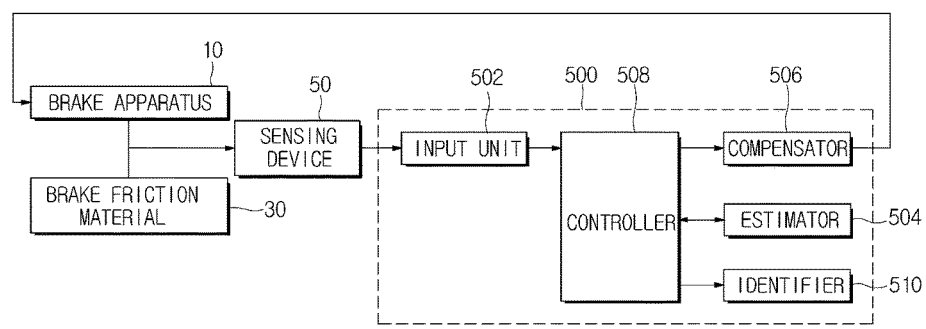
FIG. 5 is a block diagram of an example of a vehicle control apparatus in accordance with a second embodiment of the present disclosure.

FIG. 5 is a block diagram of an example of a vehicle control apparatus in accordance with a second embodiment of the present disclosure.

Referring to FIG. 5, a vehicle control apparatus 500 in accordance with the second embodiment of the present disclosure includes an input unit 502, an estimator 504, a compensator 506, and a controller 508, similar to the vehicle control apparatus 100 of FIG. 2 in accordance with the first embodiment.

Functions of the input unit 502, the estimator 504, the compensator 506, and the controller 508 of the vehicle control apparatus 500 in accordance with the second embodiment of the present disclosure and an organic relationship among them are substantially the same as the functions of the input unit 102, the estimator 104, the compensator 106, and the controller 108 of the vehicle control apparatus 100 of FIG. 2 in accordance with the first embodiment and an organic relationship among them, and are thus not described here.

The vehicle control apparatus 500 in accordance with the second embodiment of the present disclosure may further include an identifier 510.

When braking is applied, the identifier 510 identifies that a current brake state will be unstable unless the current brake state is maintained in a vehicle stopped/parked state, under control of the controller 508.

Furthermore, the identifier 510 identifies that a current brake state is stable when the brake apparatus 10 and the brake friction material 30 are reclamped to each other by the compensator 506 according to the target braking power value TB of FIG. 3, under control of the controller 508.

Although not shown, the identifier 510 may include at least one among an alarm, a speaker, and a light-emitting member provided for a driver to identify information or a state of a vehicle, and may thus identify whether a current brake state includes at least one of a stable state and an unstable state through at least one among an alarm operation of the alarm, a voice operation of the speaker, and a light-emitting operation of the light-emitting member.

Although not shown, the identifier 510 may include at least one of a human-machine interface (HMI) module and a head-up display (HUD) module installed to interface between a user and a machine so that a driver may notice information or a state of a vehicle, and may thus identify whether a current brake state includes at least one of a stable state and an unstable state through at least one of an HMI message display operation of the HMI module and an HUD message display operation of the HUD module.

A vehicle control method of controlling a vehicle using the vehicle control apparatus 500 in accordance with the second embodiment of the present disclosure will be described with reference to FIGS. 6 and 7 below.

Figure 6:
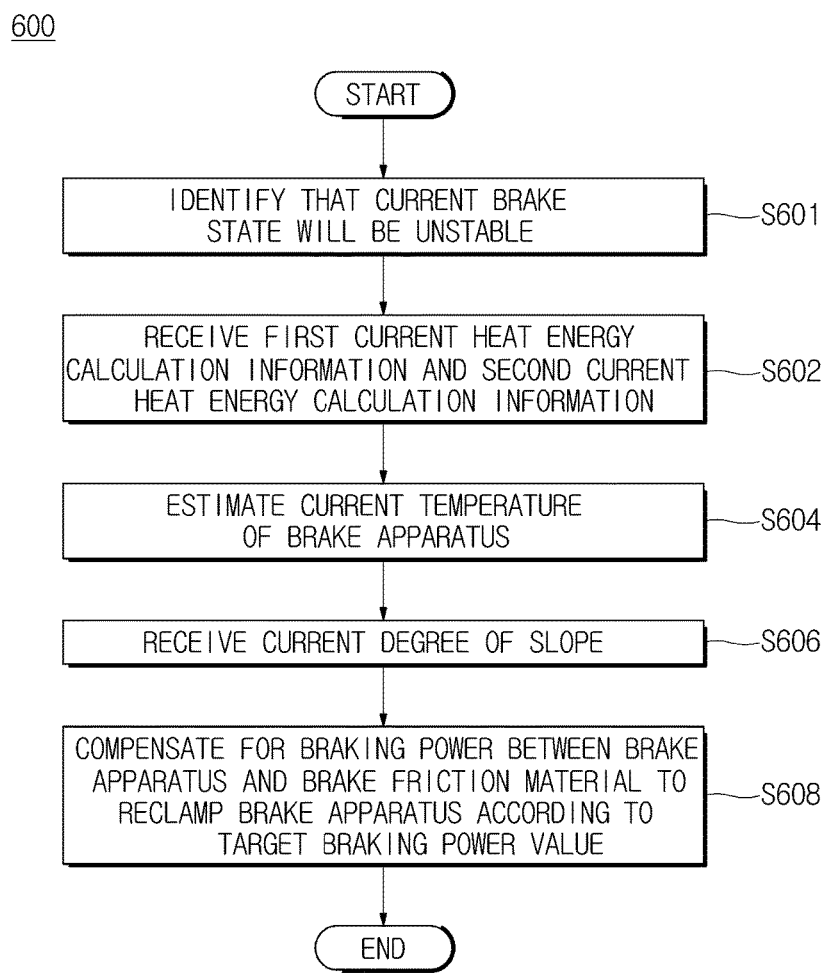
FIG. 6 is a flowchart of one example of a vehicle control method performed by the vehicle control apparatus in accordance with the second embodiment of the present disclosure.

FIG. 6 is a flowchart of one example of a vehicle control method performed by the vehicle control apparatus in accordance with the second embodiment of the present disclosure. FIG. 7 is a flowchart of another example of a vehicle control method performed by the vehicle control apparatus in accordance with the second embodiment of the present disclosure.

Figure 7:
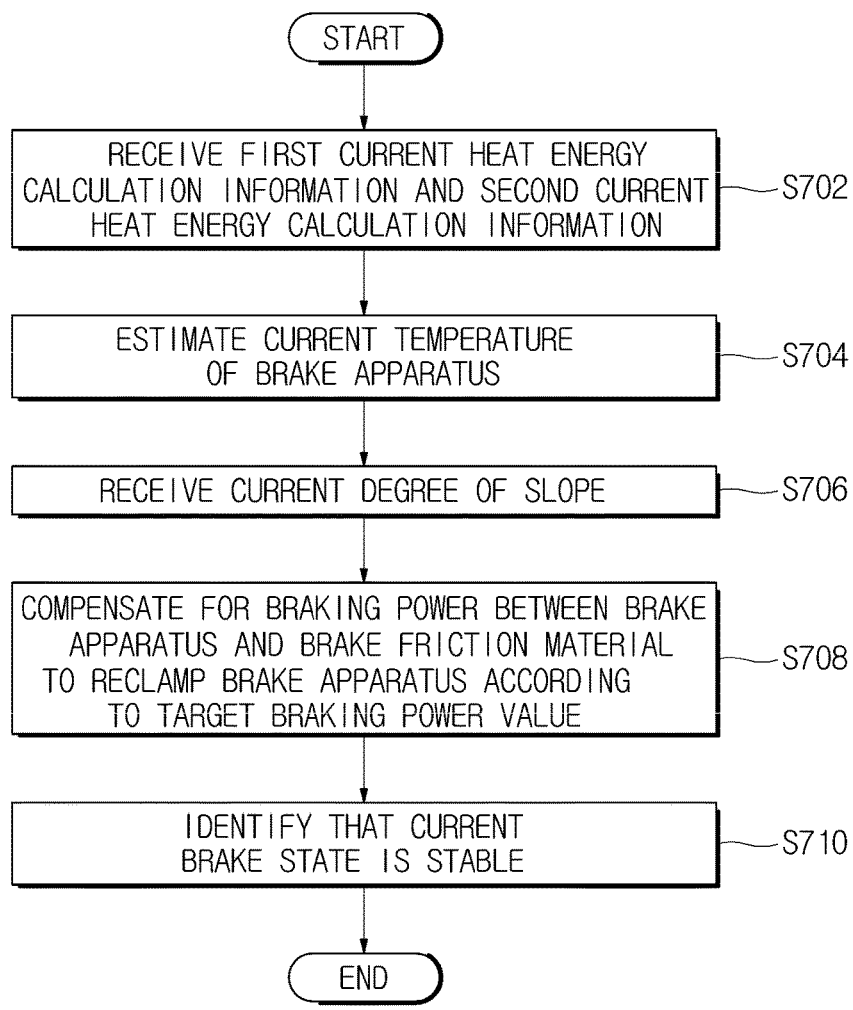
FIG. 7 is a flowchart of another example of a vehicle control method performed by the vehicle control apparatus in accordance with the second embodiment of the present disclosure.

Referring to FIGS. 6 and 7, vehicle control methods 600 and 700 performed by the vehicle control apparatus 500 of FIG. 5 in accordance with the second embodiment of the present disclosure include first input operations (S602 and S702), estimation operations (S604 and S704), second input operations (S606 and S706), and compensation operations (S608 and S708), similar to the vehicle control method 400 of FIG. 4 performed by the vehicle control apparatus 100 of FIG. 2 in accordance with the first embodiment.

Functions of the first input operations (S602 and S702), the estimation operations (S604 and S704), the second input operations (S606 and S706), and the compensation operations (S608 and S708) included in the vehicle control methods 600 and 700 performed by the vehicle control apparatus 500 of FIG. 5 in accordance with the second embodiment of the present disclosure and an organic relationship among them are substantially the same as the functions of the first input operation S402, the estimation operation S404, the second input operation S406, and the compensation operation S408 included in the vehicle control method 400 of FIG. 4 performed by the vehicle control apparatus 100 of FIG. 2 in accordance with the first embodiment and an organic relationship among them, and are thus not described here.

The vehicle control method 600 performed by the vehicle control apparatus 500 of FIG. 5 in accordance with the second embodiment of the present disclosure may further include a first identification operation (S601).

For example, the first identification operation (S601) may be performed before the first input operation (S602) is performed.

In the first identification operation (S601), in a brake apply mode, the identifier 510 of FIG. 5 identifies that a current brake state will be unstable unless the current brake state is maintained at a stopped/parked state, under control of the controller 508 of FIG. 5.

The vehicle control method 700 performed by the vehicle control apparatus 500 of FIG. 5 in accordance with the second embodiment of the present disclosure may further include a second identification operation (S710).

For example, the second identification operation (S710) may be performed after the compensation operation (S708) is performed.

In the second identification operation (S710), when the brake apparatus 10 of FIG. 5 is reclamped by the compensator 506 of FIG. 5 according to the target braking power value TB of FIG. 3, the identifier 510 identifies that a current brake state is stable, under control of the controller 508.

In the vehicle control apparatus 500 and the vehicle control methods 600 and 700 thereof in accordance with the second embodiment of the present disclosure described above, the input unit 502, the estimator 504, the compensator 506, the controller 508, and the identifier 510 are provided to perform the first identification operation (S601), the first input operations (S602 and S702), the estimation operations (S604 and S704), the second input operations (S606 and S706), the compensation operations (S608 and S708), and the second identification operation (S710).

Thus, in the vehicle control apparatus 500 and the vehicle control methods 600 and 700 thereof in accordance with the second embodiment of the present disclosure, the braking power between the brake apparatus 10 and the brake friction material 30 may be compensated for so that the brake apparatus 10 and the brake friction material 30 may be reclamped to each other on the basis of the target braking power value TB according to a current temperature of the brake apparatus 10 and a current degree of slope, thereby improving the efficiency of braking.

Furthermore, in the vehicle control apparatus 500 and the vehicle control methods 600 and 700 thereof in accordance with the second embodiment of the present disclosure, it is possible to identify that the current brake state is stable when the brake apparatus 10 and the brake friction material 30 are reclamped to each other according to the target braking power value TB, and thus the anxiety about a current braked state may be relieved when a vehicle is parked or stopped.

Figure 8:
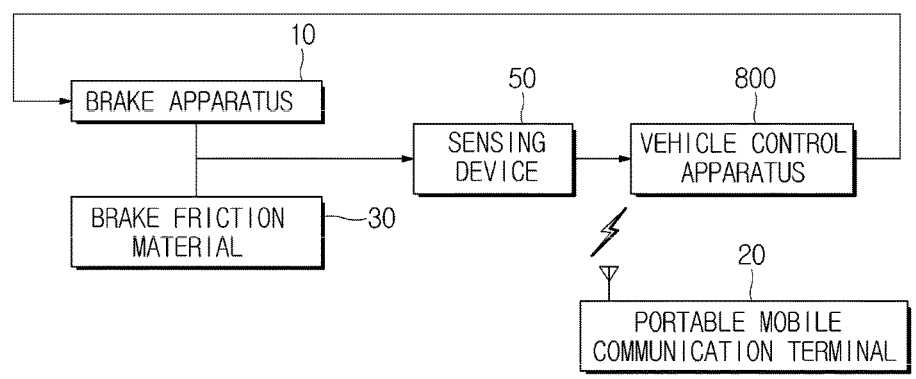
FIG. 8 is a block diagram illustrating a state in which a vehicle control apparatus in accordance with a third embodiment of the present disclosure is connected to a brake apparatus, a brake friction material, and a sensing device, and communicates with a portable mobile communication terminal.
Figure 9:
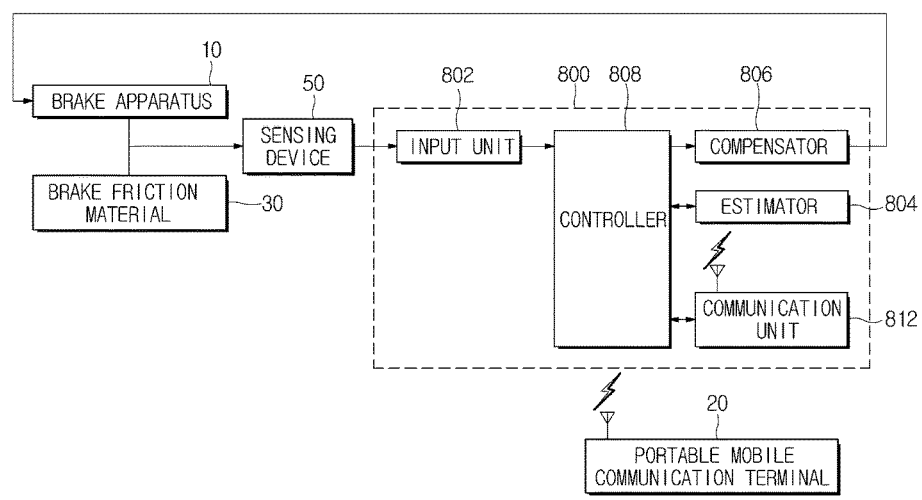
FIG. 9 is a block diagram illustrating an example of the vehicle control apparatus of FIG. 8.

FIG. 8 is a block diagram illustrating a state in which a vehicle control apparatus in accordance with a third embodiment of the present disclosure is connected to a brake apparatus, a brake friction material, and a sensing device, and communicates with a portable mobile communication terminal. FIG. 9 is a block diagram illustrating an example of the vehicle control apparatus of FIG. 8.

Referring to FIGS. 8 and 9, a vehicle control apparatus 800 in accordance with the third embodiment of the present disclosure includes an input unit 802, an estimator 804, a compensator 806, and a controller 808, similar to the vehicle control apparatus 100 of FIG. 2 in accordance with the first embodiment.

Functions of the input unit 802, the estimator 804, the compensator 806, and the controller 808 of the vehicle control apparatus 800 in accordance with the third embodiment of the present disclosure and an organic relationship among them are substantially the same as the functions of the input unit 102, the estimator 104, the compensator 106, and the controller 108 of the vehicle control apparatus 100 of FIG. 2 in accordance with the first embodiment and an organic relationship among them, and are thus not described here.

The vehicle control apparatus 800 in accordance with the third embodiment of the present disclosure may further include a communication unit 812.

The communication unit 812 may communicate with a driver's portable mobile communication terminal 20, and transmit a communication signal to the driver's portable mobile communication terminal 20 unless a current brake state is maintained in a vehicle stopped/parked state in a brake apply mode, so that the driver's portable mobile communication terminal 20 may identify that the current brake state is unstable, under control of the controller 808.

Furthermore, the communication unit 812 may communicate with the driver's portable mobile communication terminal 20, and transmit a communication signal to the driver's portable mobile communication terminal 20 so that the driver's portable mobile communication terminal 20 may identify that a current brake state is stable when the brake apparatus 10 and the brake friction material 30 are reclamped to each other according to the target braking power value TB of FIG. 3 by the compensator 806, under control of the controller 808.

Although not shown, the communication unit 812 may include at least one among a Bluetooth module, a Wi-Fi module, a Zigbee module, a Wibro module, a Wi-Max module, an LTE module, an LTE Advanced module, a Li-Fi module, and a Beacon module, and may thus communicate with the portable mobile communication terminal 20.

In this case, although not shown, the portable mobile communication terminal 20 may be a personal digital assistant (PDA), a smart phone, a tablet personal computer (PC), a cellular phone, or a notebook computer.

A vehicle control method of controlling a vehicle using the vehicle control apparatus 800 in accordance with the third embodiment of the present disclosure will be described with reference to FIGS. 10 and 11 below.

Figure 10:
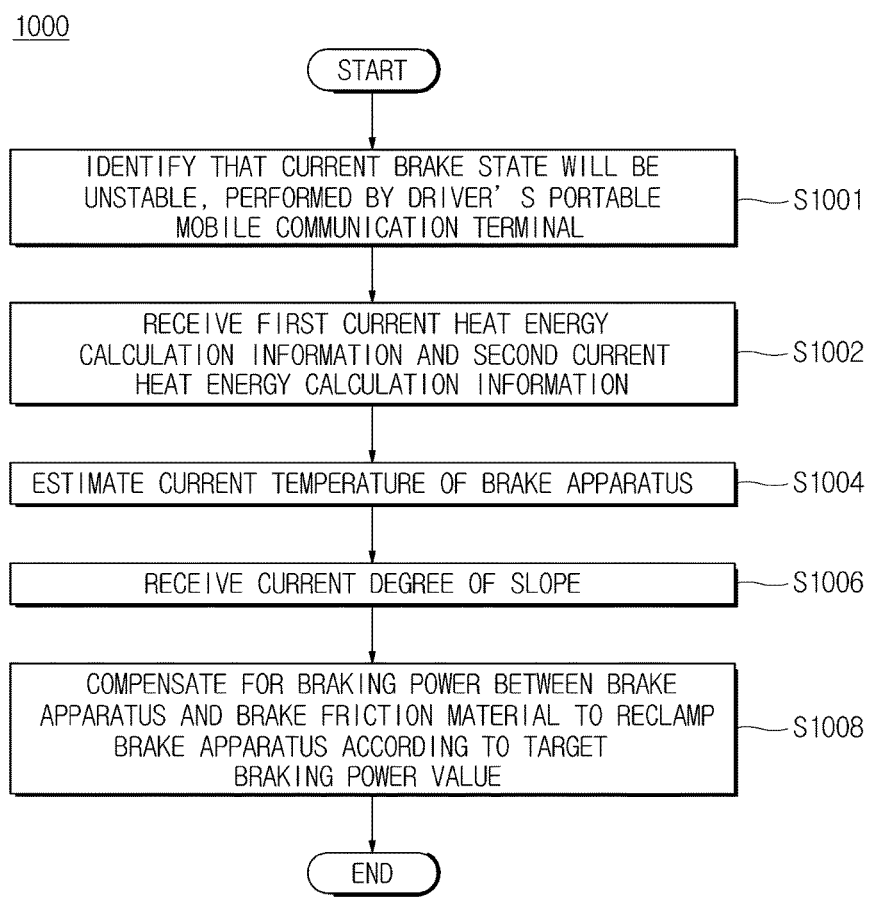
FIG. 10 is a flowchart of one example of a vehicle control method performed by the vehicle control apparatus in accordance with the third embodiment of the present disclosure.

FIG. 10 is a flowchart of one example of a vehicle control method performed by the vehicle control apparatus in accordance with the third embodiment of the present disclosure. FIG. 11 is a flowchart of another example of a vehicle control method performed by the vehicle control apparatus in accordance with the third embodiment of the present disclosure.

Figure 11:
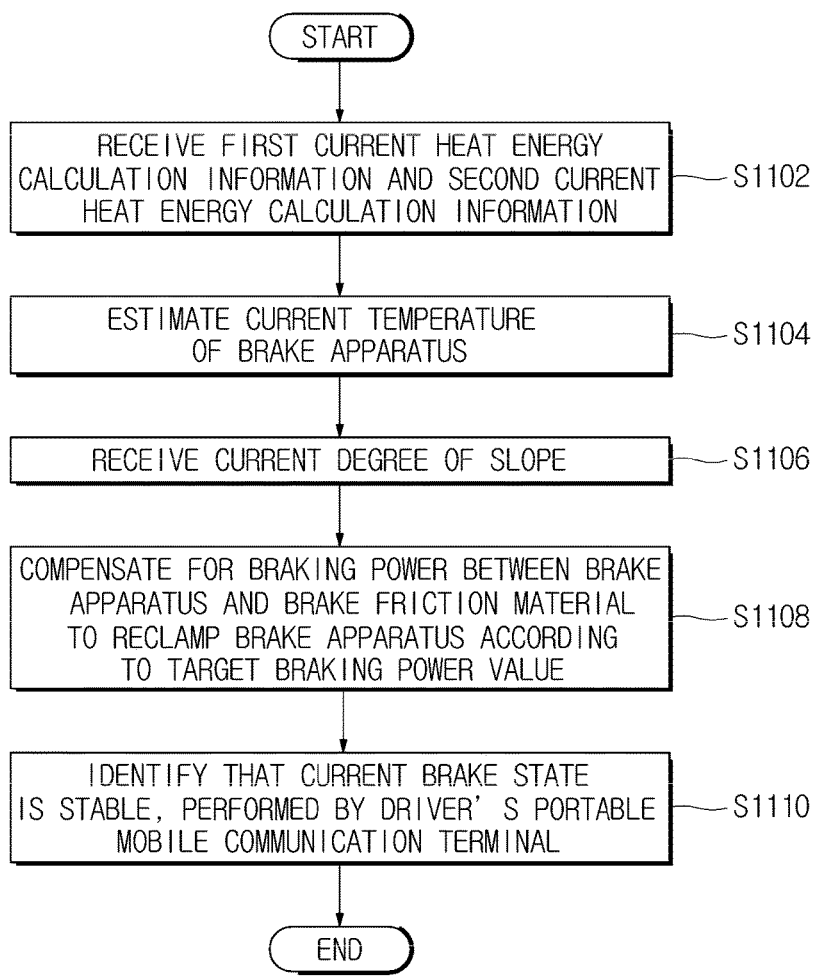
FIG. 11 is a flowchart of another example of a vehicle control method performed by the vehicle control apparatus in accordance with the third embodiment of the present disclosure.

Referring to FIGS. 10 and 11, vehicle control methods 1000 and 1100 performed by the vehicle control apparatus 800 of FIG. 9 in accordance with the third embodiment of the present disclosure includes first input operations (S1002 and S1102), estimation operations (S1004 and S1104), second input operations (S1006 and S1106), and compensation operations (S1008 and S1108), similar to the vehicle control method 400 of FIG. 4 performed by the vehicle control apparatus 100 of FIG. 2 in accordance with the first embodiment.

Functions of the first input operations (S1002 and S1102), the estimation operations (S1004 and S1104), the second input operations (S1006 and S1106), and the compensation operations (S1008 and S1108) of the vehicle control methods 1000 and 1100 performed by the vehicle control apparatus 800 of FIG. 9 in accordance with the third embodiment of the present disclosure and an organic relationship among them are substantially the same as the functions of the first input operation S402, the estimation operation S404, the second input operation S406, and the compensation operation S408 of the vehicle control method 400 of FIG. 4 performed by the vehicle control apparatus 100 of FIG. 2 in accordance with the first embodiment and an organic relationship among them, and are thus not described here.

The vehicle control methods 1000 and 1100 performed by the vehicle control apparatus 800 of FIG. 9 in accordance with the third embodiment of the present disclosure may further include a first communication operation (S1001) and a second communication operation (S1110), respectively.

For example, the first communication operation (S1001) may be performed before the first input operation (S1002) is performed.

In the first communication operation (S1001), the communication unit 812 may communicate with the driver's portable mobile communication terminal 20 of FIG. 9, and transmit a communication signal to the driver's portable mobile communication terminal 20 unless a current brake state is maintained in a vehicle stopped/parked state in a brake apply mode, so that driver's portable mobile communication terminal 20 may identify that the current brake state is unstable, under control of the controller 808 of FIG. 9 provided in a vehicle.

The second communication operation (S1110) may be performed after the compensation operation (S1108) is performed.

In the second communication operation (S1110), the communication unit 812 may communicate with the driver's portable mobile communication terminal 20 of FIG. 9, and transmit a communication signal to the driver's portable mobile communication terminal 20 so that the driver's portable mobile communication terminal 20 may identify that a current brake state is stable when the brake apparatus 10 and the brake friction material 30 are reclamped to each other according to the target braking power value TB of FIG. 3 by the compensator 806 of FIG. 9, under control of the controller 808 of FIG. 9 provided in a vehicle.

In the vehicle control apparatus 800 of FIG. 9 and the vehicle control methods 1000 and 1100 thereof in accordance with the third embodiment of the present disclosure, the input unit 802, the estimator 804, the compensator 806, the controller 808, and the communication unit 812 are provided to perform the first communication operation (S1001), the first input operations (S1002 and S1102), the estimation operations (S1004 and S1104), the second input operations (S1006 and S1106), the compensation operations (S1008 and S1108), and the second communication operation (S1110).

Thus, the vehicle control apparatus 800 and the vehicle control methods 1000 and 1100 thereof in accordance with the third embodiment of the present disclosure are capable of compensating for braking power between the brake apparatus 10 and the brake friction material 30 so that the brake apparatus 10 and the brake friction material 30 may be reclamped to each other on the basis of the target braking power value TB according to a current temperature of the brake apparatus 10 and a current degree of slope, thereby improving the efficiency of braking.

According to the vehicle control apparatus 800 and the vehicle control methods 1000 and 1100 thereof in accordance with the third embodiment of the present disclosure, there is no necessity to continuously worry whether a parked state or a stopped state is smoothly maintained after a vehicle is parked or stopped, thereby improving the convenience of parking or stopping the vehicle.

In the vehicle control apparatus 800 and the vehicle control methods 1000 and 1100 thereof in accordance with the third embodiment of the present disclosure, it is possible to identify that a current brake state will be unstable unless the current brake state is maintained in a stopped state or a parked state in a brake apply mode and thus a driver may notice that a current parked or stopped state is unstable and thus provide a rapid initial response.

In the vehicle control apparatus 800 and the vehicle control methods 1000 and 1100 thereof in accordance with the third embodiment of the present disclosure, when the brake apparatus 10 and the brake friction material 30 are reclamped to each other according to the target braking power value TB, that a current parked state or a current stopped state is stable may be identified and thus a driver may notice that the current parked state or the current stopped state is stable, thereby further improving the reliability of parking or stopping a vehicle.

Figure 12:
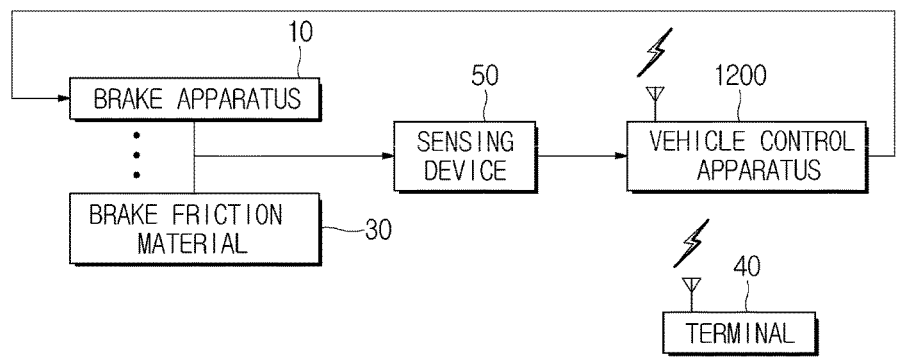
FIG. 12 is a block diagram illustrating a state in which a vehicle control apparatus in accordance with a fourth embodiment of the present disclosure is connected to a brake apparatus, a brake friction material, and a sensing device and communicates with a terminal.
Figure 13:
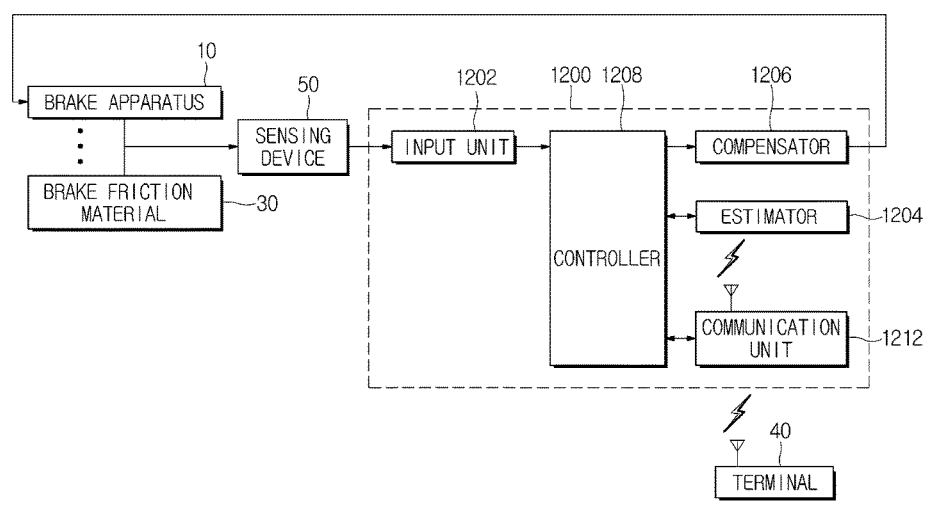
FIG. 13 is a block diagram of an example of the vehicle control apparatus of FIG. 12.

FIG. 12 is a block diagram illustrating a state in which a vehicle control apparatus in accordance with a fourth embodiment of the present disclosure is connected to a brake apparatus, a brake friction material, and a sensing device and communicates with a terminal. FIG. 13 is a block diagram of an example of the vehicle control apparatus of FIG. 12.

Referring to FIGS. 12 and 13, a vehicle control apparatus 1200 in accordance with the fourth embodiment of the present disclosure includes an input unit 1202, an estimator 1204, a compensator 1206, and a controller 1208, similar to the vehicle control apparatus 100 of FIG. 2 in accordance with the first embodiment.

Functions of the input unit 1202, the estimator 1204, the compensator 1206, and the controller 1208 of the vehicle control apparatus 1200 in accordance with the fourth embodiment of the present disclosure and an organic relationship among them are substantially the same as the functions of the input unit 102, the estimator 104, the compensator 106, and the controller 108 of the vehicle control apparatus 100 of FIG. 2 in accordance with the first embodiment and an organic relationship among them, and are thus not described here.

A brake apparatus 10 of the vehicle control apparatus 1200 in accordance with the fourth embodiment of the present disclosure may further include a predetermined unique number.

A communication unit 1212 may communicate with a terminal 40 of a vehicle maintenance center, and transmit a communication signal to the terminal 40 of the vehicle maintenance center to dispatch a manager who owns the terminal 40 to the brake apparatus 10 having the predetermined unique number when the controller 1208 determines that reclamping of the brake apparatus 10 by the compensator 1206 according to the target braking power value TB of FIG. 3 is performed more than a predetermined number of times for a predetermined time, under control of the controller 1208.

Although not shown, the communication unit 1212 may include at least one among a Bluetooth module, a Wi-Fi module, a Zigbee module, a Wibro module, a Wi-Max module, an LTE module, an LTE Advanced module, a Li-Fi module, and a Beacon module and may thus communicate with the terminal 40 of the vehicle maintenance center.

A vehicle control method of controlling a vehicle using the vehicle control apparatus 1200 in accordance with the fourth embodiment of the present disclosure will be described with reference to FIG. 14 below.

Figure 14:
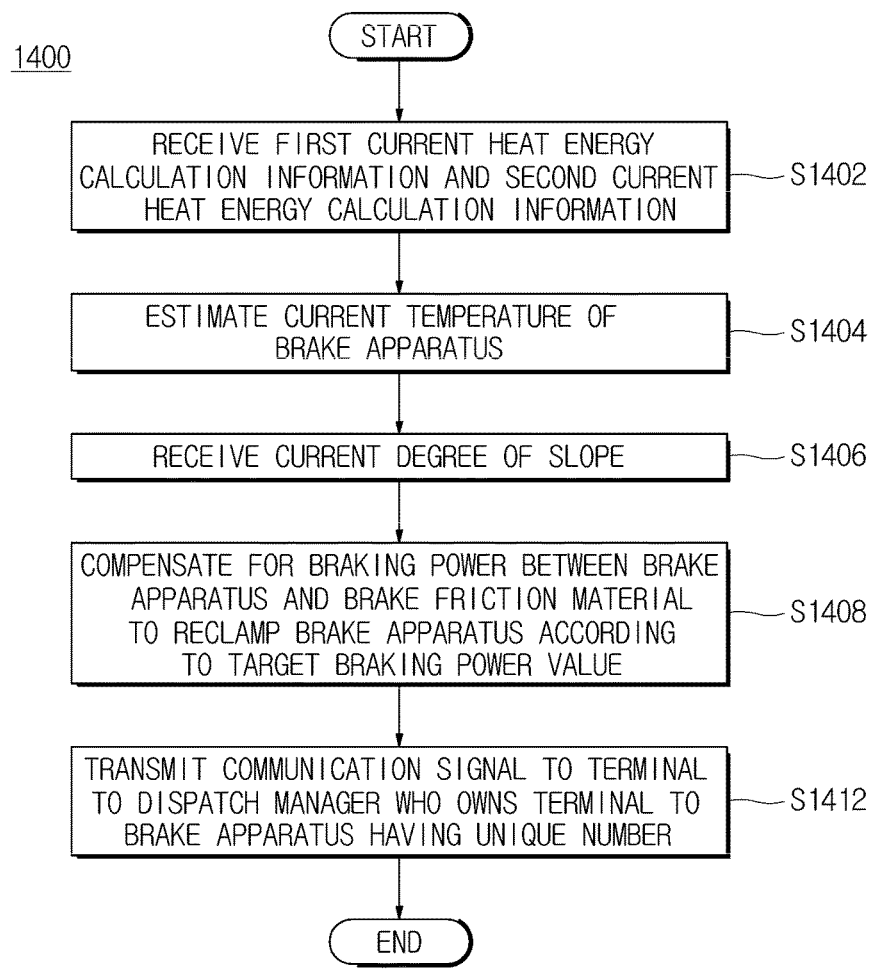
FIG. 14 is a flowchart of an example of a vehicle control method performed by the vehicle control apparatus in accordance with the fourth embodiment of the present disclosure.

FIG. 14 is a flowchart of an example of a vehicle control method performed by the vehicle control apparatus in accordance with the fourth embodiment of the present disclosure.

Referring to FIG. 14, a vehicle control method 1400 performed by the vehicle control apparatus 1200 of FIG. 13 in accordance with the fourth embodiment of the present disclosure includes a first input operation (S1402), an estimation operation (S1404), a second input operation (S1406), and a compensation operation (S1408), similar to the vehicle control method 400 of FIG. 4 performed by the vehicle control apparatus 100 of FIG. 2 in accordance with the first embodiment.

Functions of the first input operation (S1402), the estimation operation (S1404), the second input operation (S1406), and the compensation operation (S1408) of the vehicle control method 1400 performed by the vehicle control apparatus 1200 of FIG. 13 in accordance with the fourth embodiment of the present disclosure and an organic relationship among them are substantially the same as the functions of the first input operation (S402), the estimation operation (S404), the second input operation (S406), and the compensation operation (S408) of the vehicle control method 400 of FIG. 4 performed by the vehicle control apparatus 100 of FIG. 2 in accordance with the first embodiment and an organic relationship among them, and are thus not described here.

The vehicle control method 1400 performed by the vehicle control apparatus 1200 of FIG. 13 in accordance with the fourth embodiment of the present disclosure may further include a third communication operation (S1412).

For example, the third communication operation (S1412) may be performed after the compensation operation (S1408) is performed.

In the third communication operation (S1412), the communication unit 1212 may communicate with the terminal 40 of the vehicle maintenance center illustrated in FIG. 13, and transmit a communication signal to the terminal 40 so as to dispatch a manager who owns the terminal 40 to the brake apparatus 10 of FIG. 13 having a unique number when the controller 1208 of FIG. 13 determines that reclamping of the brake apparatus 10 of FIG. 13 by the compensator 1206 of FIG. 13 according to the target braking power value TB of FIG. 3 is performed more than a predetermined number of times for a predetermined time, under control of the controller 1208 of FIG. 13 provided in the vehicle.

In the vehicle control apparatus 1200 and the vehicle control method 1400 thereof in accordance with the fourth embodiment of the present disclosure described above, the input unit 1202, the estimator 1204, the compensator 1206, the controller 1208, and the communication unit 1212 are provided to perform the first input operation (S1402), the estimation operation (S1404), the second input operation (S1406), the compensation operation (S1408), and the third communication operation (S1412).

Thus, the vehicle control apparatus 1200 and the vehicle control method 1400 thereof in accordance with the fourth embodiment of the present disclosure are capable of compensating for braking power between the brake apparatus 10 and the brake friction material 30 so that the brake apparatus 10 and the brake friction material 30 may be reclamped to each other on the basis of the target braking power value TB according to a current temperature of the brake apparatus 10 and a current degree of slope, thereby improving the efficiency of braking.

Furthermore, according to the vehicle control apparatus 1200 and the vehicle control method 1400 thereof in accordance with the fourth embodiment of the present disclosure, the manager who owns the terminal 40 of the vehicle maintenance center may be dispatched to the brake apparatus 10 having the unique number.

Accordingly, the vehicle control apparatus 1200 and the vehicle control method 1400 thereof in accordance with the fourth embodiment of the present disclosure are capable of greatly reducing a maintenance time for maintaining and repairing the brake apparatus 10, thereby significantly suppressing an increase in maintenance costs.

Figure 15:
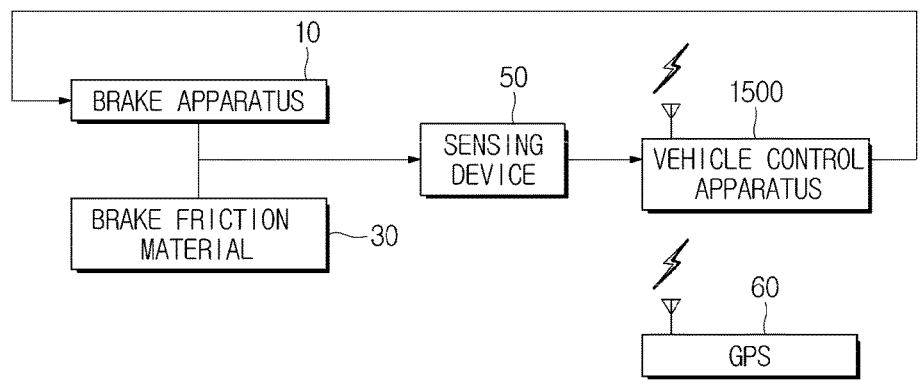
FIG. 15 is a block diagram illustrating a state in which a vehicle control apparatus in accordance with a fifth embodiment of the present disclosure is connected to a brake apparatus, a brake friction material, and a sensing device and communicates with a global positioning system (GPS).
Figure 16:
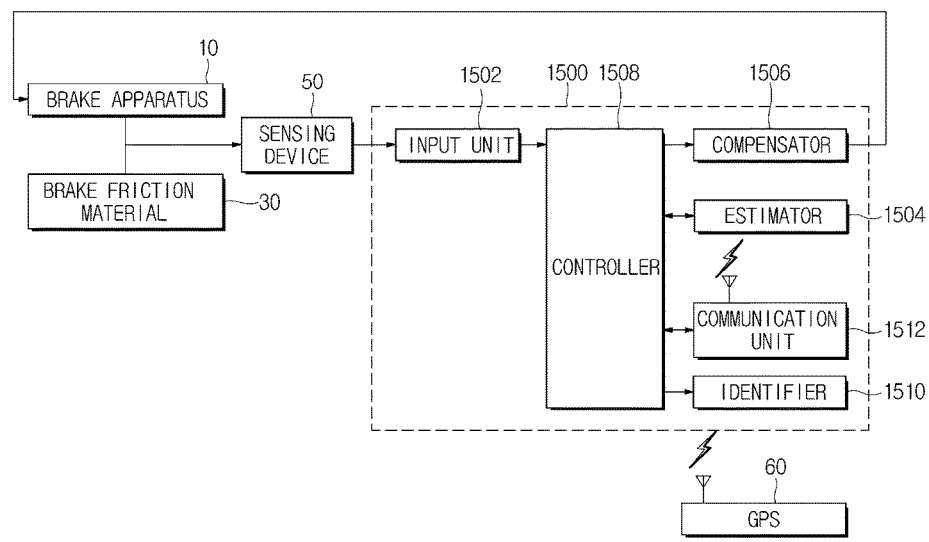
FIG. 16 is a block diagram of an example of the vehicle control apparatus of FIG. 15.

FIG. 15 is a block diagram illustrating a state in which a vehicle control apparatus in accordance with a fifth embodiment of the present disclosure is connected to a brake apparatus, a brake friction material, and a sensing device and communicates with a global positioning system (GPS). FIG. 16 is a block diagram of an example of the vehicle control apparatus of FIG. 15.

Referring to FIGS. 15 and 16, a vehicle control apparatus 1500 in accordance with the fifth embodiment of the present disclosure includes an input unit 1502, an estimator 1504, a compensator 1506, a controller 1508, similar to the vehicle control apparatus 100 of FIG. 2 in accordance with the first embodiment.

Functions of the input unit 1502, the estimator 1504, the compensator 1506, the controller 1508 of the vehicle control apparatus 1500 in accordance with the fifth embodiment of the present disclosure and an organic relationship among them are substantially the same as the functions of the input unit 102, the estimator 104, the compensator 106, the controller 108 of the vehicle control apparatus 100 of FIG. 2 in accordance with the first embodiment and an organic relationship among them, and are thus not described here.

The vehicle control apparatus 1500 in accordance with the fifth embodiment of the present disclosure may further include communication unit 1512 and identifier 1510.

The communication unit 1512 may communicate with a GPS 60, and transmit a communication signal to the GPS 60 to detect location information of nearby vehicle maintenance centers when the controller 1508 determines that reclamping of a brake apparatus 10 by the compensator 1506 according to the target braking power value TB of FIG. 3 is performed more than a predetermined number of times for a predetermined time, under control of the controller 1508.

Although not shown, the communication unit 1512 may include at least one among a Bluetooth module, a Wi-Fi module, a Zigbee module, a Wibro module, a Wi-Max module, an LTE module, an LTE Advanced module, a Li-Fi module, and a Beacon module, and may thus communicate with the GPS 60.

The identifier 1510 may identify the location information of the nearby vehicle maintenance centers detected by the GPS 60, under control of the controller 1508.

In this case, although not shown, the identifier 1510 may include at least one of an HMI module and an HUD module installed to interface between a user and a machine so that a driver may notice information or a state of a vehicle, and may thus identify the location information of the detected nearby vehicle maintenance centers through at least one of an HMI message display operation of the HMI module and an HUD message display operation of the HUD module.

A vehicle control method of controlling a vehicle using the vehicle control apparatus 1500 in accordance with the fifth embodiment of the present disclosure will be described with reference to FIG. 17 below.

Figure 17:
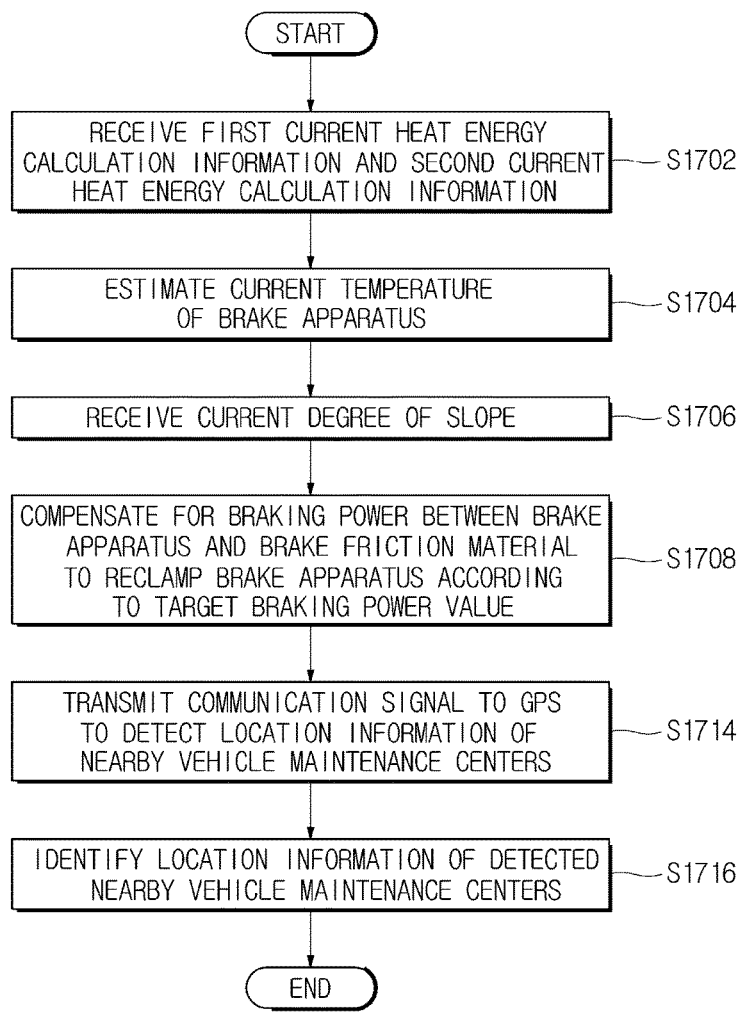
FIG. 17 is a flowchart of an example of a vehicle control method performed by the vehicle control apparatus in accordance with the fifth embodiment of the present disclosure.

FIG. 17 is a flowchart of an example of a vehicle control method performed by the vehicle control apparatus in accordance with the fifth embodiment of the present disclosure.

Referring to FIG. 17, a vehicle control method 1700 performed by the vehicle control apparatus 1500 of FIG. 16 in accordance with the fifth embodiment of the present disclosure includes a first input operation (S1702), an estimation operation (S1704), a second input operation (S1706), and a compensation operation (S1708), similar to the vehicle control method 400 of FIG. 4 performed by the vehicle control apparatus 100 of FIG. 2 in accordance with the first embodiment.

Functions of the first input operation (S1702), the estimation operation (S1704), the second input operation (S1706), and the compensation operation (S1708) of the vehicle control method 1700 performed by the vehicle control apparatus 1500 of FIG. 16 in accordance with the fifth embodiment of the present disclosure and an organic relationship among them are substantially the same as the function of the first input operation (S402), the estimation operation (S404), the second input operation (S406), and the compensation operation (S408) of the vehicle control method 400 of FIG. 4 performed by the vehicle control apparatus 100 of FIG. 2 in accordance with the first embodiment and an organic relationship among them, and are thus not described here.

The vehicle control method 1700 performed by the vehicle control apparatus 1500 of FIG. 16 in accordance with the fifth embodiment of the present disclosure may further include a fourth communication operation (S1714) and a third identification operation (S1716).

For example, the fourth communication operation (S1714) may be performed after the compensation operation (S1708) is performed, and the third identification operation (S1716) may be performed after the fourth communication operation (S1714) is performed.

That is, in the fourth communication operation (S1714), the communication unit 1512 of FIG. 16 may communicate with the GPS 60 of FIG. 16, and transmit a communication signal to the GPS 60 to detect location information of nearby vehicle maintenance centers when the controller 1508 of FIG. 16 determines that reclamping of the brake apparatus 10 of FIG. 16 by the compensator 1506 of FIG. 16 according to the target braking power value TB of FIG. 3 is performed more than a predetermined number of times for a predetermined time, under control of the controller 1508 of FIG. 16 provided in the vehicle.

Thereafter, in the third identification operation (S1716), the identifier 1510 of FIG. 16 may identify the location information of the nearby vehicle maintenance centers detected by the GPS 60, under control of the controller 1508.

In the vehicle control apparatus 1500 and the vehicle control method 1700 thereof in accordance with the fifth embodiment of the present disclosure, the input unit 1502, the estimator 1504, the compensator 1506, the controller 1508, the identifier 1510, and the communication unit 1512 are provided to perform the first input operation (S1702), the estimation operation (S1704), the second input operation (S1706), the compensation operation (S1708), the fourth communication operation (S1714), and the third identification operation (S1716).

Thus, the vehicle control apparatus 1500 and the vehicle control method 1700 thereof in accordance with the fifth embodiment of the present disclosure are capable of compensating for braking power between the brake apparatus 10 and the brake friction material 30 so that the brake apparatus 10 and the brake friction material 30 may be reclamped to each other on the basis of the target braking power value TB according to a current temperature of the brake apparatus 10 and a current degree of slope, thereby improving the efficiency of braking.

Furthermore, in the vehicle control apparatus 1500 and the vehicle control method 1700 thereof in accordance with the fifth embodiment of the present disclosure, location information of nearby vehicle maintenance centers may be detected and identified when the reclamping of the brake apparatus 10 according to the target braking power value TB is performed more than a predetermined number of times for a predetermined time.

Thus, with the vehicle control apparatus 1500 and the vehicle control method 1700 thereof in accordance with the fifth embodiment of the present disclosure, a driver may easily locate a vehicle maintenance center.

Thus, the vehicle control apparatus 1500 and the vehicle control method 1700 thereof in accordance with the fifth embodiment of the present disclosure may decrease a maintenance time for maintaining and repairing a vehicle and thus a traffic accident may be prevented from occurring while suppressing an increase in maintenance costs.

Figure 18:
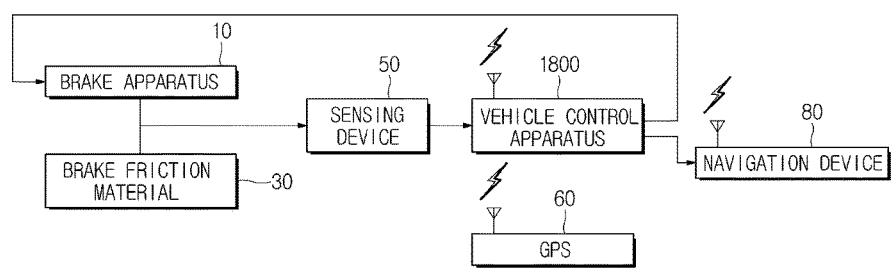
FIG. 18 is a block diagram illustrating a state in which a vehicle control apparatus in accordance with a sixth embodiment of the present disclosure is connected to a brake apparatus, a brake friction material, and a sensing device and communicates with a navigation device and a GPS.
Figure 19:
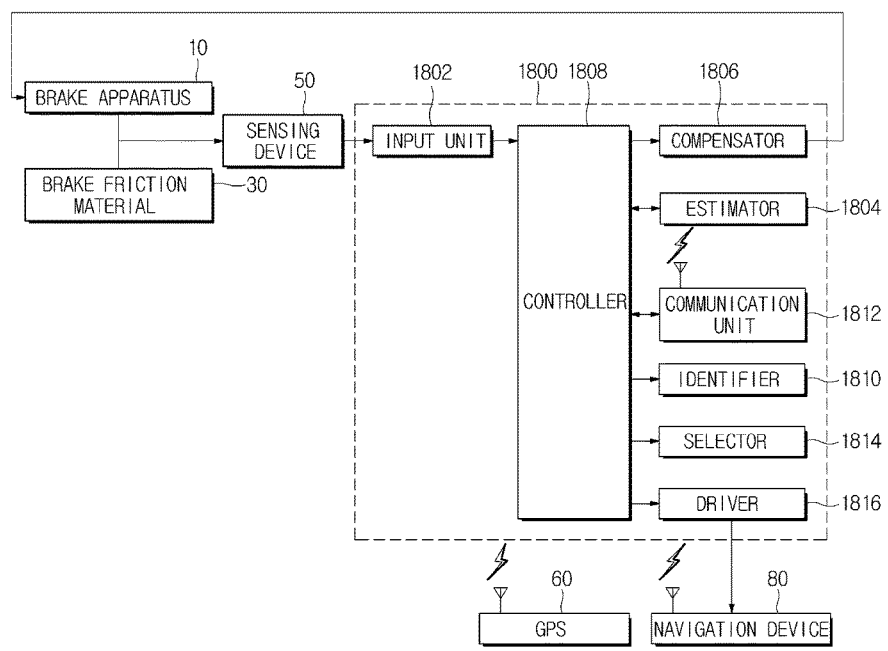
FIG. 19 is a block diagram of an example of the vehicle control apparatus of FIG. 18.

FIG. 18 is a block diagram illustrating a state in which a vehicle control apparatus in accordance with a sixth embodiment of the present disclosure is connected to a brake apparatus, a brake friction material, and a sensing device and communicates with a navigation device and a GPS. FIG. 19 is a block diagram of an example of the vehicle control apparatus of FIG. 18.

Referring to FIGS. 18 and 19, a vehicle control apparatus 1800 in accordance with the sixth embodiment of the present disclosure includes an input unit 1802, an estimator 1804, a compensator 1806, a controller 1808, an identifier 1810, and the communication unit 1812, similar to the vehicle control apparatus 1500 of FIG. 16 in accordance with the fifth embodiment.

Functions of the input unit 1802, the estimator 1804, the compensator 1806, the controller 1808, the identifier 1810, and the communication unit 1812 of the vehicle control apparatus 1800 in accordance with the sixth embodiment of the present disclosure and an organic relationship among them are substantially the same as the functions of the input unit 1502, the estimator 1504, the compensator 1506, the controller 1508, the identifier 1510, and the communication unit 1512 of the vehicle control apparatus 1500 of FIG. 16 in accordance with the fifth embodiment and an organic relationship among them, and are thus not described here.

The vehicle control apparatus 1800 in accordance with the sixth embodiment of the present disclosure may further include a selector 1814 and a driver 1816.

The selector 1814 may select location information of a desired vehicle maintenance center among location information of nearby vehicle maintenance centers identified by the identifier 1810.

For example, the selector 1814 may enable a driver to touch and select location information of a desired vehicle maintenance center with his or her finger among location information of nearby vehicle maintenance centers displayed by at least one of an HMI module (not shown) and an HUD module (not shown).

The driver 1816 may transmit a navigation driving signal to a navigation device 80 to arrive at the vehicle maintenance center corresponding to the location information of the vehicle maintenance center selected by the selector 1814, under control of the controller 1808.

In this case, although not shown, the input unit 1802, the estimator 1804, the compensator 1806, the controller 1808, and the driver 1816 may be provided to a conventional ECU (not shown) which is a main computer applied to a vehicle and configured to control overall operations of the vehicle, receive data, estimate a current temperature of the brake apparatus 10, compensate for braking power between the brake apparatus 10 and the brake friction material 30, and transmit the navigation driving signal to the navigation device 80.

Alternatively, although not shown, the input unit 1802, the estimator 1804, the compensator 1806, the controller 1808, and the driver 1816 may be provided to a conventional MCU (not shown) which includes a processor, a memory, and an I/O device within a single chip and is configured to control overall operations of the vehicle, input data, estimate a temperature of the brake apparatus 10, compensate for braking power between the brake apparatus 10 and the brake friction material 30, and transmit the navigation driving signal to the navigation device 80.

However, the input unit 1802, the estimator 1804, the compensator 1806, the controller 1808, and the driver 1816 are not limited thereto, and may be any control means, any input means, any estimation means, any compensation means, and any driving means which may control overall operations of the vehicle, input data, estimate a temperature of the brake apparatus 10, compensate for braking power between the brake apparatus 10 and the brake friction material 30, and transmit the navigation driving signal to the navigation device 80.

Here, the input unit 1802, the estimator 1804, the compensator 1806, the controller 1808, and the driver 1816 may be provided to the ECU or the MCU in an integrated form or separately.

A vehicle control method of controlling a vehicle using the vehicle control apparatus 1800 in accordance with the sixth embodiment of the present disclosure will be described with reference to FIG. 20 below.

Figure 20:
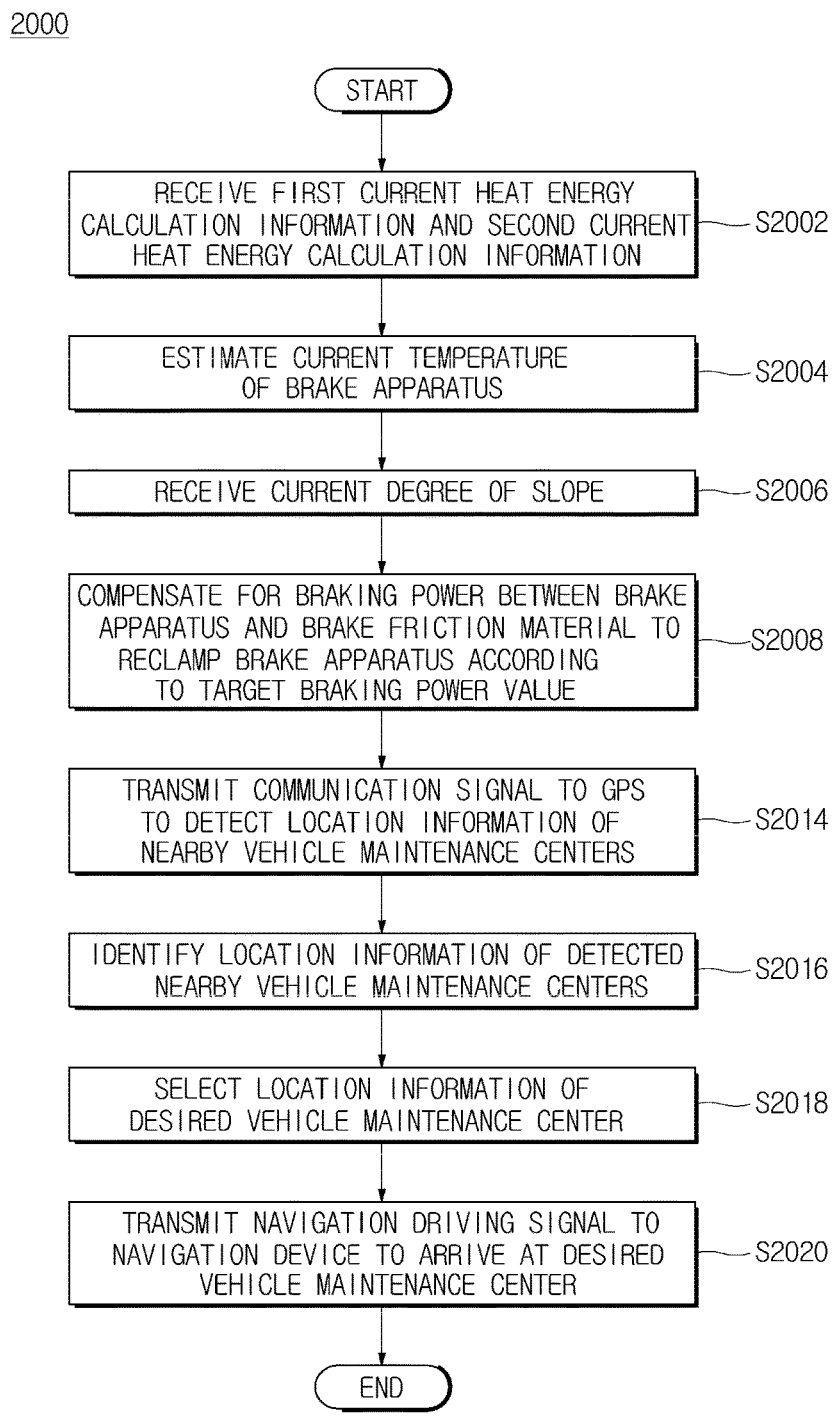
FIG. 20 is a flowchart of an example of a vehicle control method performed by the vehicle control apparatus in accordance with the sixth embodiment of the present disclosure.

FIG. 20 is a flowchart of an example of a vehicle control method performed by the vehicle control apparatus in accordance with the sixth embodiment of the present disclosure.

Referring to FIG. 20, a vehicle control method 2000 performed by the vehicle control apparatus 1800 of FIG. 19 in accordance with the sixth embodiment of the present disclosure includes a first input operation (S2002), an estimation operation (S2004), a second input operation (S2006), a compensation operation (S2008), a fourth communication operation (S2014), and a third identification operation (S2016), similar to the vehicle control method 1700 of FIG. 17 performed by the vehicle control apparatus 1500 of FIG. 16 in accordance with the fifth embodiment.

Functions of the first input operation (S2002), the estimation operation (S2004), the second input operation (S2006), the compensation operation (S2008), the fourth communication operation (S2014), and the third identification operation (S2016) of the vehicle control method 2000 performed by the vehicle control apparatus 1800 of FIG. 19 in accordance with the sixth embodiment of the present disclosure and an organic relationship among them are substantially the same as the functions of the first input operation (S1702), the estimation operation (S1704), the second input operation (S1706), the compensation operation (S1708), the fourth communication operation (S1714), and the third identification operation (S1716) of the vehicle control method 1700 of FIG. 17 of the vehicle control apparatus 1500 of FIG. 16 in accordance with the fifth embodiment and an organic relationship among them, and are thus not described here.

The vehicle control method 2000 performed by the vehicle control apparatus 1800 of FIG. 19 in accordance with the sixth embodiment of the present disclosure may further include a first selection operation (S2018) and a driving operation (S2020).

For example, the first selection operation (S2018) may be performed after the third identification operation (S2016), and the driving operation (S2020) may be performed after the first selection operation (S2018).

In the first selection operation (S2018), location information of a desired vehicle maintenance center may be selected by using the selector 1814 of FIG. 19 among location information of nearby vehicle maintenance centers identified by the identifier 1810 of FIG. 19.

Next, in the driving operation (S2020), a navigation driving signal may be transmitted to the navigation device 80 of FIG. 19 to arrive at the vehicle maintenance center corresponding to the location information of the desired vehicle maintenance center selected by the selector 1814, under control of the controller 1808 of FIG. 19.

In the vehicle control apparatus 1800 and the vehicle control method 2000 thereof in accordance with the sixth embodiment of the present disclosure, the input unit 1802, the estimator 1804, the compensator 1806, the controller 1808, the identifier 1810, the communication unit 1812, the selector 1814, and the driver 1816 are provided to perform the first input operation (S2002), the estimation operation (S2004), the second input operation (S2006), the compensation operation (S2008), the fourth communication operation (S2014), the third identification operation (S2016), the first selection operation (S2018), and the driving operation (S2020).

Thus, the vehicle control apparatus 1800 and the vehicle control method 2000 thereof in accordance with the sixth embodiment of the present disclosure are capable of compensating for braking power between the brake apparatus 10 and the brake friction material 30 so that the brake apparatus 10 and the brake friction material 30 may be reclamped to each other on the basis of a target braking power value TB according to a temperature of the current brake apparatus 10 and a current degree of slope, thereby improving the efficiency of braking.

Furthermore, in the vehicle control apparatus 1800 and the vehicle control method 2000 thereof in accordance with the sixth embodiment of the present disclosure, when the reclamping of the brake apparatus 10 according to the target braking power value TB is performed more than a predetermined number of times for a predetermined time, location information of nearby vehicle maintenance centers may be detected and identified, location information of a desired vehicle maintenance center may be selected among the location information of the identified nearby vehicle maintenance centers, and a vehicle may be arrived at the vehicle maintenance center corresponding to the selected location information.

Thus, according to the vehicle control apparatus 1800 and the vehicle control method 2000 thereof in accordance with the sixth embodiment of the present disclosure, vehicle maintenance centers may be more easily located and the vehicle may be arrived at the location of a desired vehicle maintenance center.

Accordingly, the vehicle control apparatus 1800 and the vehicle control method 2000 thereof in accordance with the sixth embodiment of the present disclosure are capable of further decreasing a maintenance time for maintaining and repairing a vehicle and thus preventing a traffic accident from occurring while further suppressing an increase in maintenance costs.

Figure 21:
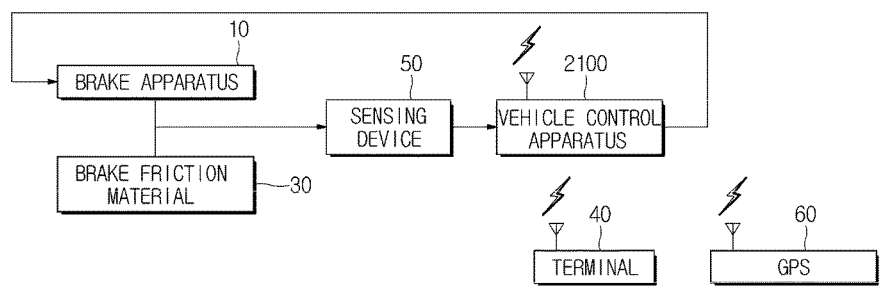
FIG. 21 is a block diagram illustrating a state in which a vehicle control apparatus in accordance with a seventh embodiment of the present disclosure is connected to a brake apparatus, a brake friction material, and a sensing device and communicates with a terminal and a GPS.
Figure 22:
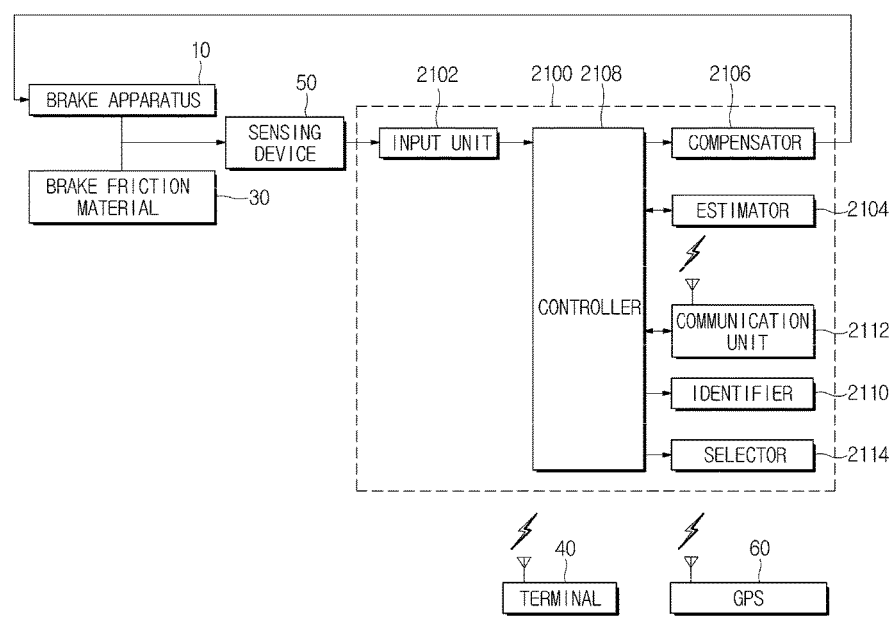
FIG. 22 is a block diagram of an example of the vehicle control apparatus of FIG. 21.

FIG. 21 is a block diagram illustrating a state in which a vehicle control apparatus in accordance with a seventh embodiment of the present disclosure is connected to a brake apparatus, a brake friction material, and a sensing device and communicates with a terminal and a GPS. FIG. 22 is a block diagram of an example of the vehicle control apparatus of FIG. 21.

Referring to FIGS. 21 and 22, a vehicle control apparatus 2100 in accordance with the seventh embodiment of the present disclosure includes an input unit 2102, an estimator 2104, a compensator 2106, and a controller 2108, similar to the vehicle control apparatus 100 of FIG. 2 in accordance with the first embodiment.

Functions of the input unit 2102, the estimator 2104, the compensator 2106, and the controller 2108 of the vehicle control apparatus 2100 in accordance with the seventh embodiment of the present disclosure and an organic relationship among them are substantially the same as the functions of the input unit 102, the estimator 104, the compensator 106, and the controller 108 of the vehicle control apparatus 100 of FIG. 2 in accordance with the first embodiment and an organic relationship among them, and are thus not described here.

The vehicle control apparatus 2100 in accordance with the seventh embodiment of the present disclosure may further include a communication unit 2112, an identifier 2110, and a selector 2114.

The communication unit 2112 may communicate with a GPS 60 and communicate with a terminal 40 of a nearby vehicle maintenance center detected by the GPS 60 when the controller 2108 determines that reclamping of a brake apparatus 10 according to the target braking power value TB of FIG. 3 is performed more than a predetermined number of times for a predetermined time, under control of the controller 2108.

Although not shown, the communication unit 2112 may include at least one among a Bluetooth module, a Wi-Fi module, a Zigbee module, a Wibro module, a Wi-Max module, an LTE module, an LTE Advanced module, a Li-Fi module, and a Beacon module, and may thus communicate with the GPS 60 and the terminal 40.

The identifier 2110 may identify information inquiring whether a dispatch command is to be accepted or not, which is received from the terminal 40 of the nearby vehicle maintenance center detected by the GPS 60, under control of the controller 2108.

In this case, although not shown, the identifier 2110 may include at least one of an HMI module and an HUD module installed to interface between a user and a machine so that a driver may notice information or a state of a vehicle, and may thus identify the information inquiring whether the dispatch command is to be accepted or not, which is received from the terminal 40 of the nearby vehicle maintenance center, through at least one of an HMI message display operation of the HMI module and an HUD message display operation of the HUD module.

The selector 2114 may select the dispatch command (which is included in the information inquiring whether the dispatch command is to be accepted or not, and identified by the identifier 2110) to be requested or not to be requested.

For example, the selector 2114 may enable a driver to touch and select the dispatch command (which is included in the information inquiring whether the dispatch command is to be accepted or not, and displayed by at least one of the HMI module and the HUD module) with his or her finger to be requested or not to be requested.

A vehicle control method of controlling a vehicle using the vehicle control apparatus 2100 in accordance with the seventh embodiment of the present disclosure will be described with reference to FIG. 23 below.

Figure 23:
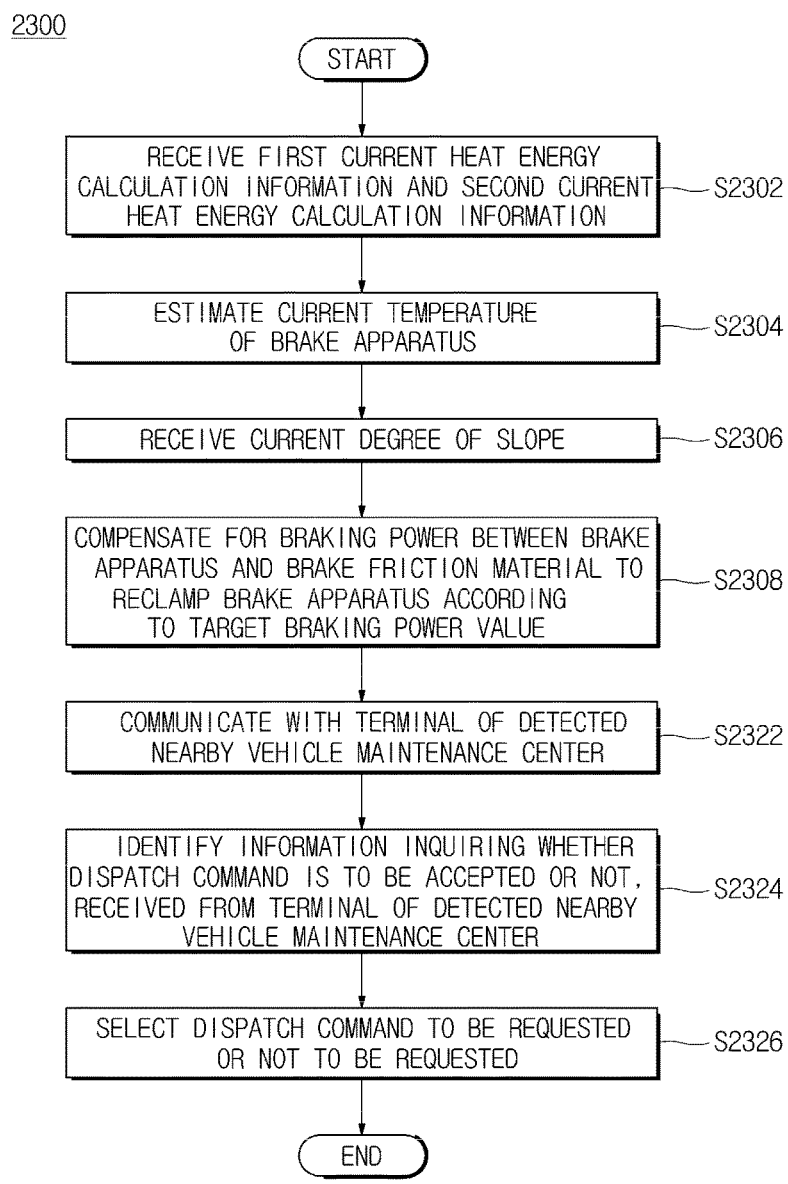
FIG. 23 is a flowchart of an example of a vehicle control method performed by the vehicle control apparatus in accordance with the seventh embodiment of the present disclosure.

FIG. 23 is a flowchart of an example of a vehicle control method performed by the vehicle control apparatus in accordance with the seventh embodiment of the present disclosure.

Referring to FIG. 23, a vehicle control method 2300 performed by the vehicle control apparatus 2100 of FIG. 22 in accordance with the seventh embodiment of the present disclosure includes a first input operation (S2302), an estimation operation (S2304), a second input operation (S2306), and a compensation operation (S2308), similar to the vehicle control method 400 of FIG. 4 performed by the vehicle control apparatus 100 of FIG. 2 in accordance with the first embodiment.

Functions of the first input operation (S2302), the estimation operation (S2304), the second input operation (S2306), and the compensation operation (S2308) of the vehicle control method 2300 performed by the vehicle control apparatus 2100 of FIG. 22 in accordance with the seventh embodiment of the present disclosure and an organic relationship among them are substantially the same as the functions of the first input operation (S402), the estimation operation (S404), the second input operation (S406), and the compensation operation (S408) of the vehicle control method 400 of FIG. 4 performed by the vehicle control apparatus 100 of FIG. 2 in accordance with the first embodiment and an organic relationship among them, and are thus not described here.

The vehicle control method 2300 performed by the vehicle control apparatus 2100 of FIG. 22 in accordance with the seventh embodiment of the present disclosure may further include a fifth communication operation (S2322), a fourth identification operation (S2324), and a second selection operation (S2326).

For example, the fifth communication operation (S2322) may be performed after the compensation operation (S2308) is performed, the fourth identification operation (S2324) may be performed after the fifth communication operation (S2322) is performed, and the second selection operation (S2326) may be performed after the fourth identification operation (S2324) is performed.

In the fifth communication operation (S2322), the communication unit 2112 of FIG. 22 may communicate with the GPS 60 of FIG. 22, and communicate with the terminal 40 of FIG. 22 of the nearby vehicle maintenance center detected by the GPS 60 of FIG. 22 when the controller 2108 of FIG. 22 determines that reclamping of the brake apparatus 10 according to the target braking power value TB of FIG. 3 is performed more than a predetermined number of times for a predetermined time, under control of the controller 2108 of FIG. 22 provided in a vehicle.

Next, in the fourth identification operation (S2324), the identifier 2110 of FIG. 22 may identify information inquiring whether a dispatch command is to be accepted or not, which is received from the terminal 40 of the nearby vehicle maintenance center detected by the GPS 60, under control of the controller 2108.

Next, in the second selection operation (S2326), the selector 2114 of FIG. 22 may select the dispatch command (which is included in the information inquiring whether the dispatch command is to be accepted or not, and identified by the identifier 2110) to be requested or not to be requested.

In the vehicle control apparatus 2100 and the vehicle control method 2300 thereof in accordance with the seventh embodiment of the present disclosure, the input unit 2102, the estimator 2104, the compensator 2106, the controller 2108, the identifier 2110, the communication unit 2112, and the selector 2114 are provided to perform the first input operation (S2302), the estimation operation (S2304), the second input operation (S2306), the compensation operation (S2308), the fifth communication operation (S2322), the fourth identification operation (S2324), and the second selection operation (S2326).

Thus, the vehicle control apparatus 2100 and the vehicle control method 2300 thereof in accordance with the seventh embodiment of the present disclosure are capable of compensating for braking power between the brake apparatus 10 and the brake friction material 30 so that the brake apparatus 10 and the brake friction material 30 may be reclamped to each other on the basis of the target braking power value TB according to a temperature of the current brake apparatus 10 and a current degree of slope, thereby improving the efficiency of braking.

Furthermore, in the vehicle control apparatus 2100 and the vehicle control method 2300 thereof in accordance with the seventh embodiment of the present disclosure, when the reclamping of the brake apparatus 10 according to the target braking power value TB is performed more than a predetermined number of times for a predetermined time, communication may be established with the terminal 40 of the detected nearby vehicle maintenance center, information inquiring whether a dispatch command is to be accepted, which is received from the terminal 40 of the nearby vehicle maintenance center, may be identified, and the dispatch command included in this information may be requested or may not be requested.

Thus, the vehicle control apparatus 2100 and the vehicle control method 2300 thereof in accordance with the seventh embodiment of the present disclosure are capable of requesting a manager who owns the terminal 40 of the vehicle maintenance center to be dispatched if necessary.

Accordingly, the vehicle control apparatus 2100 and the vehicle control method 2300 thereof in accordance with the seventh embodiment of the present disclosure are capable of greatly decreasing a maintenance time for maintaining and repairing a vehicle and thus preventing a traffic accident from occurring while further suppressing an increase in maintenance costs.

As is apparent from the above description, a vehicle control apparatus and a control method thereof in accordance with an embodiment of the present disclosure are capable of improving the efficiency of braking.

The vehicle control apparatus and a control method thereof in accordance with an embodiment of the present disclosure are also capable of relieving the anxiety about a current braked state when a vehicle is parked or stopped.

The vehicle control apparatus and a control method thereof in accordance with an embodiment of the present disclosure are also capable of improving the convenience of parking or stopping a vehicle.

The vehicle control apparatus and a control method thereof in accordance with an embodiment of the present disclosure are also capable of providing a rapid initial response.

The vehicle control apparatus and a control method thereof in accordance with an embodiment of the present disclosure are also capable of improving the reliability of parking or stopping a vehicle.

The vehicle control apparatus and a control method thereof in accordance with an embodiment of the present disclosure are also capable of suppressing an increase in maintenance costs.

The vehicle control apparatus and a control method thereof in accordance with an embodiment of the present disclosure are also capable of preventing a traffic accident from occurring while suppressing an increase in maintenance costs.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle control apparatus comprising:
   an input unit to receive first current heat energy calculation information between a brake apparatus and a brake friction material when braking is applied, receive second current heat energy calculation information between the brake apparatus and the brake friction material when the braking is released, and receive a current degree of slope, wherein the first current heat energy calculation information, the second current heat energy calculation information, and the current degree of slope are sensed by a sensing device;
   an estimator to estimate a current temperature of the brake apparatus on the basis of information regarding the difference between the first current heat energy calculation information and the second current heat energy calculation information, wherein the first current heat energy calculation information comprises a brake pressure value, a friction coefficient of the brake friction material, and a rate of speed of each wheel, and the second current heat energy calculation information comprises an atmospheric temperature, a temperature of the brake apparatus, and the rate of speed of each wheel;
   a compensator to compensate for braking power between the brake apparatus and the brake friction material so as to reclamp the brake apparatus and the brake friction material to each other on the basis of a target braking power value which is set according to the estimated current temperature of the brake apparatus and the current degree of slope; and
   a controller to receive the first current heat energy calculation information, the second current heat energy calculation information, and the current degree of slope, transmit an estimation command to the estimator, and transmit a compensation command to the compensator.

2. The vehicle control apparatus according to claim 1, wherein the first current heat energy calculation information further include at least one of a radius of each wheel, a radius of a disc, an area of the brake friction material, a weight of the brake apparatus, and a thermal property coefficient of a material of the brake apparatus.

3. The vehicle control apparatus according to claim 1, wherein the second current heat energy calculation information further include at least one of an area of the brake apparatus, the weight of the brake apparatus, and the thermal property coefficient of a material of the brake apparatus.

4. The vehicle control apparatus according to claim 1, wherein the brake apparatus comprises at least one of a disc brake and a drum brake.

5. The vehicle control apparatus according to claim 1, wherein the brake friction material comprises at least one of a brake pad and a brake lining.

6. The vehicle control apparatus according to claim 1, further comprising an identifier to identify that a current brake state is to be unstable unless a current brake state is maintained at a stopped state or a parked state of a vehicle during the application of the braking.

7. The vehicle control apparatus according to claim 1, further comprising an identifier to identify that a current brake state is stable when the brake apparatus and the brake friction material are reclamped to each other according to the target braking power value.

8. The vehicle control apparatus according to claim 1, further comprising a communication unit to communicate with a driver's portable mobile communication terminal and transmit a communication signal to the driver's portable mobile communication terminal to identify that a current brake state is to be unstable unless a current brake state is maintained at a stopped state or a parked state of a vehicle during the application of the braking, under control of the controller.

9. The vehicle control apparatus according to claim 1, further comprising a communication unit to communicate with a driver's portable mobile communication terminal and transmit a communication signal to the driver's portable mobile communication terminal to identify that a current brake state is stable when the brake apparatus and the brake friction material are reclamped to each other according to the target braking power value, under control of the controller.

10. The vehicle control apparatus according to claim 1, wherein the brake apparatus comprises a predetermined unique number, and
    the vehicle control apparatus further comprises a communication unit to communicate with a terminal of a vehicle maintenance center and transmit a communication signal to the terminal to dispatch a manager who owns the terminal to the brake apparatus having the predetermined unique number when the reclamping of the brake apparatus according to the target braking power value is performed more than a predetermined number of times for a predetermined time, under control of the controller.

11. The vehicle control apparatus according to claim 1, further comprising: a communication unit to communicate with a global positioning system (GPS) and transmit a communication signal to the GPS to detect location information of nearby vehicle maintenance centers when the reclamping of the brake apparatus according to the target braking power value is performed more than a predetermined number of times for a predetermined time, under control of the controller; and
    an identifier to identify the location information of the detected nearby vehicle maintenance centers.

12. The vehicle control apparatus according to claim 11, further comprising:

a selector to select the location information of a desired vehicle maintenance center among the location information of the detected nearby vehicle maintenance centers; and a driver to transmit a navigation driving signal to a navigation device to arrive at the vehicle maintenance center corresponding to the selected location information of the vehicle maintenance center.

13. The vehicle control apparatus according to claim 1, further comprising:

a communication unit to communicate with a global positioning system (GPS) and communicate with a terminal of a nearby vehicle maintenance center detected by the GPS when the reclamping of the brake apparatus according to the target braking power value is performed more than a predetermined number of times for a predetermined time, under control of the controller;

an identifier to identify information inquiring whether a dispatch command is to be accepted or not, the information being received from the terminal of the detected nearby vehicle maintenance center; and a selector to select the dispatch command, which is included in the identified information inquiring whether the dispatch command is to be accepted or not, to be requested or not to be requested.

14. A vehicle control method comprising:

receiving first current heat energy calculation information between a brake apparatus and a brake friction material when braking is applied, and receiving second current heat energy calculation information between the brake apparatus and the brake friction material when the braking is released, wherein the first current heat energy calculation information and the second current heat energy calculation information are sensed by a sensing device;

estimating a current temperature of the brake apparatus on the basis of information regarding the difference between the first current heat energy calculation information and the second current heat energy calculation information, wherein the first current heat energy calculation information comprises a brake pressure value, a friction coefficient of the brake friction material, and a rate of speed of each wheel, and the second current heat energy calculation information comprises an atmospheric temperature, a temperature of the brake apparatus, and the rate of speed of each wheel;

receiving a current degree of slope sensed by the sensing device; and compensating for braking power between the brake apparatus and the brake friction material so as to reclamp the brake apparatus and the brake friction material to each other on the basis of a target braking power value which is set according to the estimated current temperature of the brake apparatus and the current degree of slope.

15. The vehicle control method of claim 14, wherein the first current heat energy calculation information further include at least one of a radius of each wheel, a radius of a disc, an area of the brake friction material, a weight of the brake apparatus, and a thermal property coefficient of a material of the brake apparatus.

16. The vehicle control method of claim 14, wherein the second current heat energy calculation information further include at least one of an area of the brake apparatus, the weight of the brake apparatus, and the thermal property coefficient of a material of the brake apparatus.

17. The vehicle control method of claim 14, wherein the brake apparatus comprises at least one of a disc brake and a drum brake.

18. The vehicle control method of claim 14, wherein the brake friction material comprises at least one of a brake pad and a brake lining.

19. The vehicle control method of claim 14, further comprising identifying that a current brake state is to be unstable unless a current brake state is maintained at a stopped state or a parked state of a vehicle during the application of the braking.

20. The vehicle control method of claim 14, further comprising identify that a current brake state is stable when the brake apparatus and the brake friction material are reclamped to each other according to the target braking power value.

* * * * *